United States Patent [19]

Fujita et al.

[11] Patent Number: 5,121,247
[45] Date of Patent: Jun. 9, 1992

[54] TWO-DIMENSIONAL OPTICAL SCANNING SYSTEM

[75] Inventors: Hiroo Fujita, Sayama; Tetsuro Ishizuka, Iruma, both of Japan

[73] Assignee: Citizen Watch Co., Ltd., Tokyo, Japan

[21] Appl. No.: 402,033

[22] Filed: Sep. 5, 1989

[30] Foreign Application Priority Data

Sep. 6, 1988 [JP] Japan .................. 63-221377
Nov. 2, 1988 [JP] Japan .................. 63-278032
Jun. 22, 1989 [JP] Japan .................. 1-155780

[51] Int. Cl.⁵ .............. G02B 26/08; G02F 1/29; G02F 1/33
[52] U.S. Cl. ................. 359/298; 359/305; 258/201
[58] Field of Search ........... 350/370, 371, 380, 6.4, 350/358, 6.8; 358/235, 201; 359/305–314, 218, 219, 298

[56] References Cited

U.S. PATENT DOCUMENTS 3,713,721  1/1973  Watson ................. 350/371
4,611,245  9/1986  Trias ................... 350/371
4,753,498  6/1988  Saitoh et al. ........... 350/6.8

FOREIGN PATENT DOCUMENTS 0052613  3/1983  Japan ................. 350/6.8

Primary Examiner—Eugene R. LaRoche
Assistant Examiner—Evelyn A. Lester
Attorney, Agent, or Firm—Finnegan, Henderson, Farabow, Garrett & Dunner

[57] ABSTRACT

A two-dimensional optical scanning system two fine-optical deflectors for a stepwise and fine deflection of a laser beam in two directions perpendicular to each other, whereby a fine scan zone can be stepwise scanned by the laser beam at a fine deflection distance. The optical scanning system also may have two coarse-optical deflectors for a stepwise and coarse deflection of the laser beam, whereby a coarse scan area can be scanned by the laser beam, the fine scan zone being encompassed by the coarse scan area at a coarse deflection distance, the fine zone being encompassed by the coarse scan area.

16 Claims, 17 Drawing Sheets

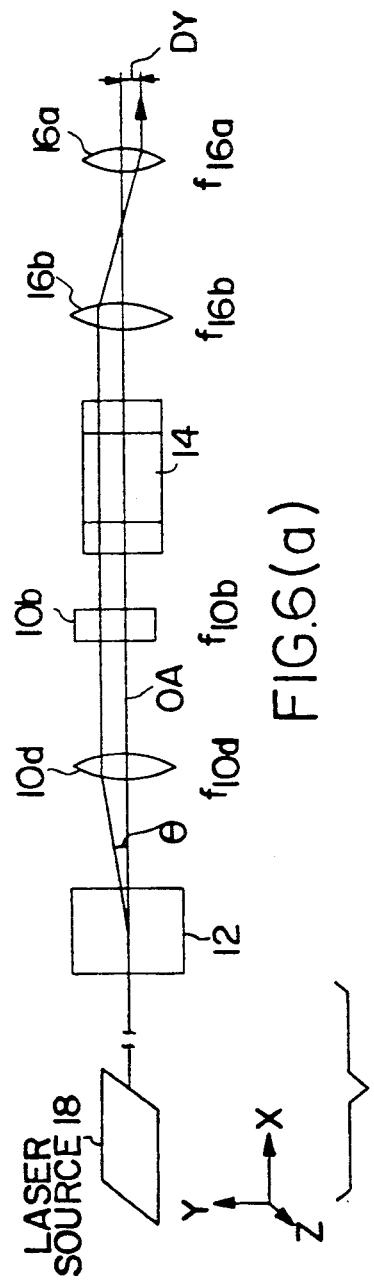
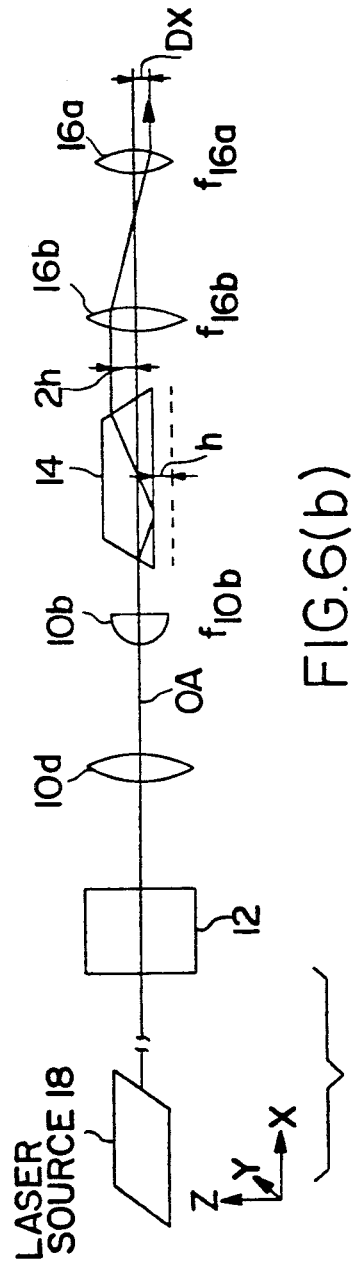

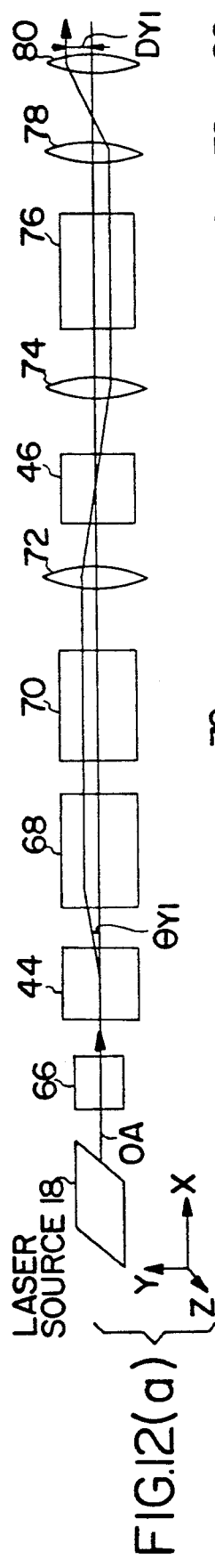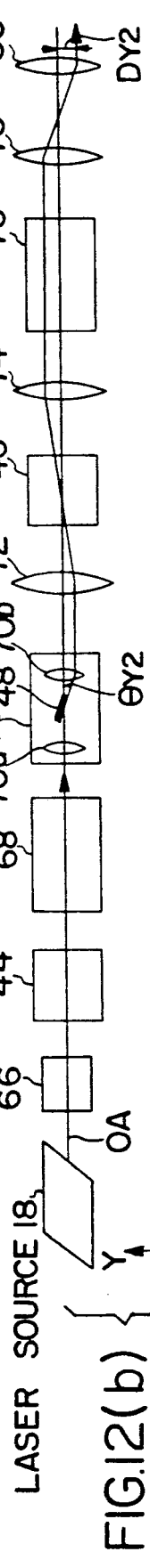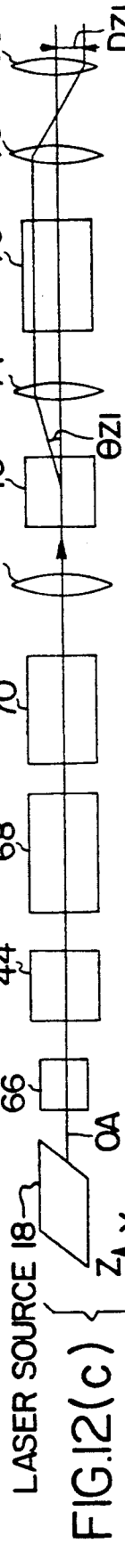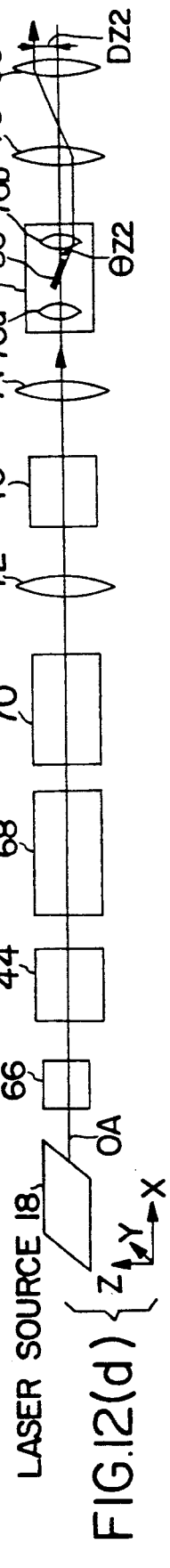

TWO-DIMENSIONAL OPTICAL SCANNING SYSTEM

BACKGROUND OF THE INVENTION

1) Field of the Invention

The present invention relates to an optical scanning system for deflecting a laser beam stepwise, to scan a fine zone with the stepwise deflected laser beam.

2) Description of the Related Art

Developments in precision manufacturing now demand a very high accuracy in the working of various precision components. For example, in the manufacturing of a precision component such as an integrated circuit, a magnetic head or the like, the working accuracy must be on the order of less than 1 μm. In particular, a fine circuit pattern of the integrated circuit and a fine gap of the magnetic head must be worked on the order of less than 1 μm. Accordingly, in the manufacturing of the precision component, it is necessary to frequently measure the dimensions of the fine pattern to control the quality of the precision component.

British Patent No. 2,147,097 and U.S. patent application Ser. Nos. 014,619 and 151,699 disclose an optical measurement apparatus for dimensionally measuring a fine object or pattern formed on or in the precision component, which comprises a laser beam source for emitting a laser beam having a Gaussian distribution, and an optical scanning system for scanning a measuring zone, including the fine pattern, with the laser beam. The optical scanning system includes a light deflection means such as an acoustic-optical device for deflecting the laser beam stepwise in a fixed plane perpendicular to the measuring zone including the fine pattern. Namely, the measuring zone is scanned with the stepwise deflected laser beam along a scanning line included in the fixed plane. Note that the acoustic-optical device is able to stepwise deflect the laser beam so that the laser beam spot is gradually shifted along the measuring zone by steps of about 0.01 μm.

The optical measurement apparatus further comprises a detector for detecting a light intensity of a laser beam reflected from the measuring zone at each of the scanning steps, and a processor for preparing a reflected light intensity distribution on the basis of data obtained from the detector during the scanning operation, and for processing the reflected light intensity distribution to determine a dimension of the fine pattern to be measured along the scanning line. This measurement is based upon the phenomenon that the laser beam is reflected in a different manner at the fine object or pattern than at other areas except therefor. For example, when the fine pattern has a reflectivity different from that of the other areas, a light intensity of the laser beam reflected at the fine pattern is different from that of the laser beam reflected at the other areas. Accordingly, the reflected light intensity distribution as mentioned above represents a dimension of the fine pattern to be measured along the scanning line, whereby the fine pattern dimension can be determined by suitably processing the reflected light intensity distribution, as disclosed in British Patent No. 2,147,097 and U.S. patent application Ser. Nos. 014,619 and 151,699.

In the conventional optical scanning system, the laser beam is deflected only on the fixed plane, as mentioned above. Namely, the laser beam scan is carried out only along a line which is fixed with respect to the optical scanning system. Accordingly, the fine pattern to be measured must be shifted with respect to the optical scanning system before several dimensions of the fine pattern can be measured, and therefore the optical measurement apparatus is provided with a mechanically movable table on which the precision component is mounted as a sample. The movable table can be two-dimensionally shifted with respect to the optical scanning system, so that the presision component mounted thereon is brought to a measuring position at which the fine pattern of the precision component is scanned with the laser beam.

Nevertheless, since a mechanical means is used to move the table, it is difficult to precisely and quickly position the table as desired, because the operation of the mechanical means is inevitably accompanied by vibration.

Accordingly, a two-dimensional optical scanning system has been developed for measuring several dimensions of the fine pattern without moving the pattern. This two-dimensional scanning system includes a second light deflection means such as a galvano mirror for a stepwise deflection of the laser beam in a direction perpendicular to the scanning direction, in which the laser beam is deflected by the first light deflection means or an acoustic-optical device. Namely, in the two-dimensional optical scanning system, a raster scan can be carried out by the second light deflection means or the galvano mirror, whereby several dimensions of the fine pattern can be quickly measured without moving the fine pattern.

Nevertheless, although there is a demand for a quick measurment of dimensions of the fine pattern in two directions perpendicular to each other, this demand cannot be satisfied by the two-dimensional optical scanning system as mentioned above because the galvano mirror cannot gradually deflect the laser beam by the same fine distance as can the acoustic-optical device. Namely, the fine pattern must be turned through a 90-degree arc after a dimension of the fine pattern has been measured in one of the two directions perpendicular to each other.

As apparent from the above, the precision component must be moved by the table to the measuring position at which the fine pattern of the precision component is scanned with the laser beam, before the measurement can be performed in the optical measurement apparatus. But this positioning of the precision component is very difficult because of the extremely small size of the fine pattern.

SUMMARY OF THE INVENTION

Accordingly, an object of the present invention is to provide a two-dimensional optical scanning system which is preferably incorporated into an optical measurement apparatus as disclosed in British Patent No. 2,147,097 and U.S. patent application Ser. Nos. 014,619 and 151,699, and which makes it possible to quickly measure the dimensions of a fine pattern of a precision component in two directions perpendicular to each other, with such an optical measurement apparatus.

Another object of the present invention is to provide a two-dimensional optical scanning system as mentioned above, which is arranged in such a manner that a laser beam per se is made accessible to a measuring zone including the fine pattern without moving the precision component with respect to the optical scanning system.

A further object of the present invention is to provide a light deflection prism which can be advantageously used in a two-dimensional optical scanning system as mentioned above, to stepwisely deflect a laser beam by a fine distance on the order of 0.01 μm.

Accordingly, in accordance with the present invention, there is provided a two-dimensional optical scanning system comprising a first light deflection means for a stepwise deflection of a laser beam by a fine distance in a first plane including an optical axis of the optical scanning system, and a second light deflection means for a stepwise deflection of the laser beam by a fine distance in a second plane perpendicular to the first plane and including the optical axis, whereby the first and second light deflection means can define a two-dimesional scanning area which is scanned by the laser beam in two directions perpendicular to each other.

In the two-dimensional optical scanning system according to the present invention, preferably each of the first and second light deflection means causes a stepwise deflection of the laser beam by a fine distance on the order of less than 0.01 μm, and accordingly, preferably the first and second light deflection means comprise an acoustic-optical device or a dove prism. Also, one of the first and second light deflection means preferably comprises an acoustic-optical device, and the other means comprises a dove prism.

According to the present invention, the two-dimensional optical scanning system further comprises a third light deflection means for a stepwise deflection of the laser beam in the above-mentioned first plane by a distance larger than the fine distance by which the laser beam is stepwise deflected by the first light deflection means, and a fourth light deflection means for a stepwise deflection of the laser beam in the above-mentioned second plane by a distance larger than the fine distance by which the laser beam is stepwise deflected by the second light deflection means, whereby the third and fourth light deflection means define a two-dimesional scanning area which is scanned by the laser beam in two directions perpendicular to each other and which is larger than the above-mentioned two-dimesional scanning area defined by the first and second light deflection means.

In accordance with another aspect of the present invention, there is provided a light deflection prism comprising a first prism element having a cross section of an equilateral triangle, and a second prism element having a cross section of a right-angle triangle having angles of 90, 60, and 30 degrees, the first prism element being combined with the second prism element in such a manner that one of the three corners of the first prism element forms a right angle together with the corner having an angle of 30 degrees of the second prism element. This light deflection prism is preferably used as at least one of the first and second light deflection means in the two-dimensional optical scanning system as mentioned above.

BRIEF DESCRIPTION OF THE DRAWINGS

These and other objects of the present invention will be better understood from the following description, with reference to the accompanying drawings, in which:

FIGS. 6(a) and 6(b) are schematic views showing a fine two-dimensional deflection of the laser beam in the two-dimensional optical scanning system of FIG. 5;

FIGS. 12(a) to 12(d) are schematic views showing fine and coarse two-dimensional deflections in the two-dimensional optical scanning system of FIG. 11;

DESCRIPTION OF THE PREFERRED EMBODIMENTS

Figure 1:
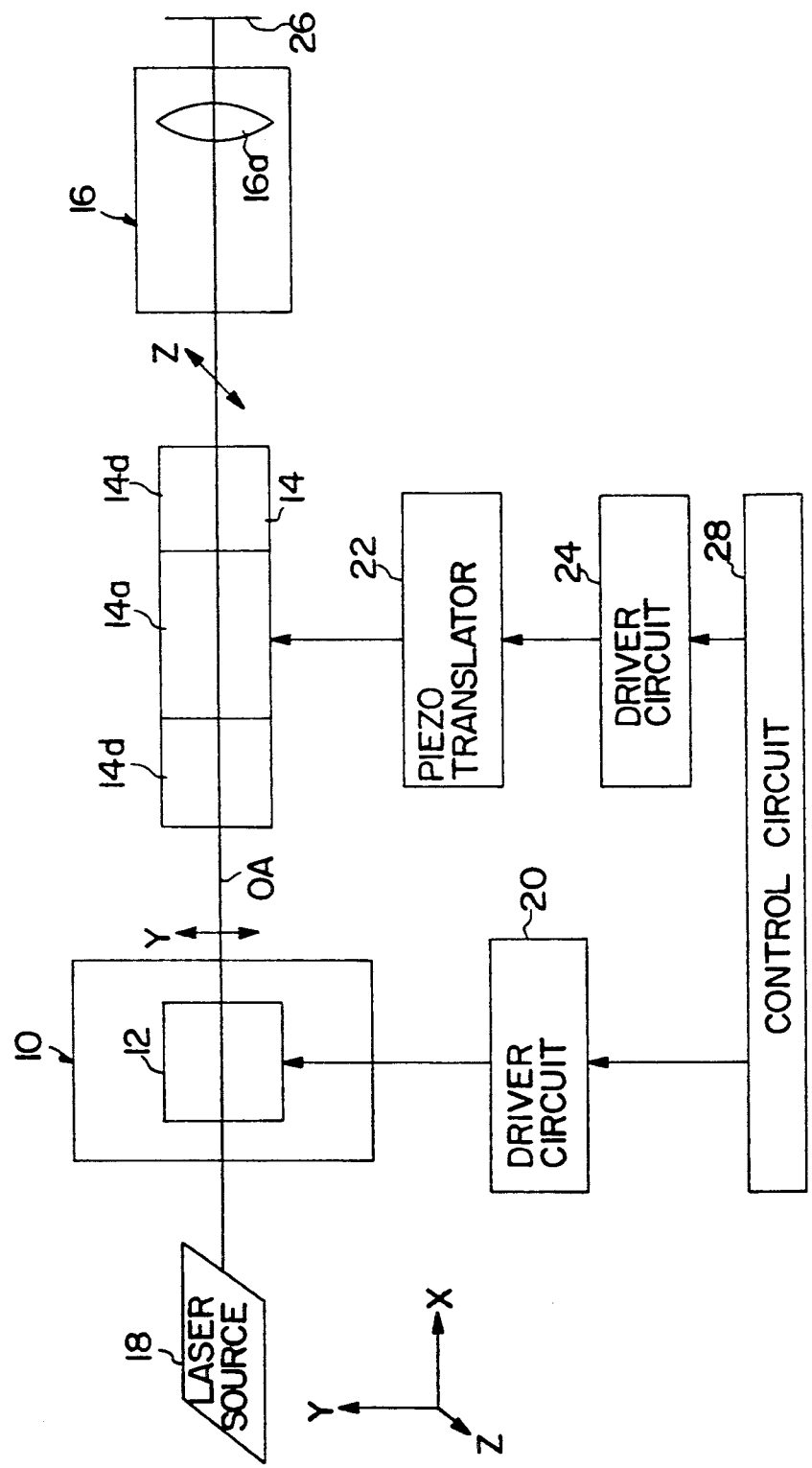
FIG. 1 is a block diagram showing a two-dimensional optical scanning system according to the present invention.

FIG. 1 is a block diagram of a two-dimensional optical scanning system according to the present invention. This two-dimensional optical scanning system comprises a first optical system 10 including an acoustic-optical device 12, a light deflection prism 14, and a second optical system 16 including a object lens 16a, and these elements are disposed along an optical axis OA thereof. In a three-dimensional coordinate system (X, Y, Z) shown in FIG. 1, the optical axis OA is included in a first plane (or drawing sheet plane) defined by the coordinate axes X and Y, and is in accordance with the coordinate axis X.

Figure 2:
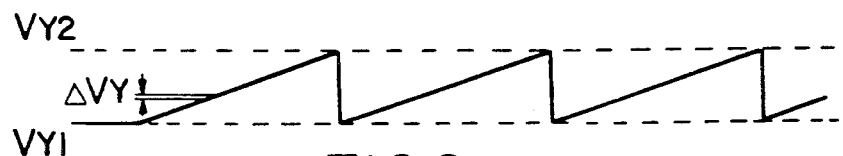
FIG. 2 is a graph showing a ramp voltage applied to an acoustic-optical device used in the two-dimensional optical scanning system of FIG. 1.

The first optical system 10 receives a laser beam, emitted from a laser source 18 such as a He-Ne laser, Ar laser, or semiconductor laser, along the optical axis OA. The acoustic-optical device 12, which is commercially available, for example, from IntraAction Corp. as Model ADM-40, stepwise deflects the laser beam along a direction of the coordinate axis Y in the first plane (X, Y). As is well known, the acoustic-optical device 12 includes a transparent medium through which the laser beam can pass, and an electro-acoustic transducer such as a piezo-electric transducer acoustically coupled to the transparent medium. The acoustic-optical device 12 is actuated by applying a ramp voltage (FIG. 2) from a driver circuit 20 to the piezo-electric transducer, so that the laser beam is deflected in proportion to a level of the ramp voltage. Namely, the laser beam passing through the transparent medium is stepwise deflected by gradually varying the ramp voltage by $\Delta V_Y$, between $V_{Y1}$ and $V_{Y2}$, as shown in FIG. 2.

Figure 3A:
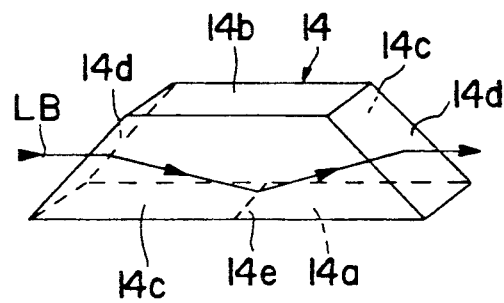
FIGS. 3(a) and 3(b) are perspective views of a dove prism used in the two-dimensional optical scanning system of FIG. 1.
Figure 3B:
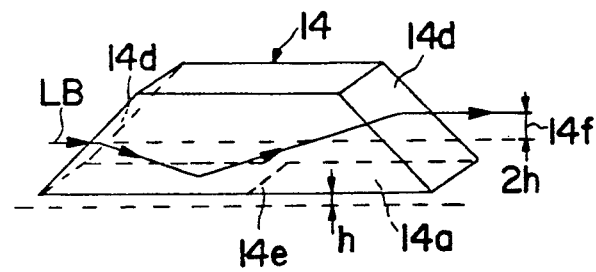

The light deflection prism 14 per se is well known as a dove prism and is commercially available, for example, from Melles Griot Corp. as Model 01PDE001. The dove prism 14 generally has a trapezoid-like appearance, as shown in FIGS. 3(a) and 3(b). Namely, the dove prism 14 is defined by a bottom face 14a, a top face 14b, a pair of side faces 14c, and a pair of slanting end faces 14d. For example, in Model 01PDE001, the dove prism 14 is made of an optical glass having a refraction index of 1.51, the bottom face 14a has a length of 42.3 mm, and each of the slanting end faces 14d defines an angle of 45 degrees with the bottom face 14a. Under these requirements, as shown in FIG. 3(a), a He-Ne laser beam LB having a wavelength of 633 nanometer can be incident upon one of the slant end faces 14d in parallel with the bottom face 14a so that the incident laser beam is refracted within the dove prism 14 to be reflected at a mid line 14e of the bottom face 14a. In this case, the reflected laser beam is emitted from other slanting end face 14d to be aligned with the incident light beam LB. When the dove prism 14 is shifted upward from the position of FIG. 3(a) by a fine distance of h, as shown in FIG. 3(b), a point at which the refracted laser beam is reflected on the bottom face 14a is shifted from the mid line 14e toward the slanting end face 14d upon which the laser beam LB is incident, so that the reflected laser beam is emitted from the other slanting end face 14d to be offset or deflected from an extension line (broken line) 14f of the incident laser beam LB by the distance of 2h.

Figure 4:
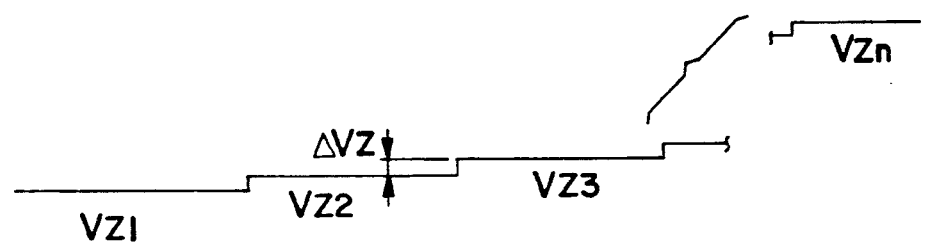
FIG. 4 is a graph showing a stepwise voltage applied to a piezo translator to which the dove prism is coupled.

In the two-dimensional optical scanning system shown in FIG. 1, the light deflection prism or dove prism 14 can moved along the coordinate axis Z, and this move is carried out in a stepwise manner by a piezo translator 22 which is actuated by applying a voltage thereto from a driver circuit 24. In particular, the voltage applied to the piezo translator 22 from the driver circuit 24 is varied in a stepwise manner as shown in FIG. 4 so that the dove prism 14 is moved stepwise in a direction of the coordinate axis Z, whereby the laser beam emitted from the first optical system 10 can be deflected along a direction of the coordinate axis Z in a second plane defined by the coordinate axes X and Z. Note, in FIG. 4, a difference $\Delta V_Z$ ($V_{Z(n-1)} - V_{Zn}$) is constant. The piezo translator 22 is commercially available, for example, from Queensgate Instruments Corp. as Model DPT/AX100.

The laser beam emitted from the dove prism 14 is incident upon the second optical system 16, and is then focused by the object lens 16a on a scanning plane 26 as a spot on the order of 1 μm.

The driver circuits 20 and 24 are controlled by a control circuit 28 including a microprocessor. In particular, the ramp voltage applied to the piezo-electric transducer of the acoustic-optical device 12 from the driver circuit 20 can be varied stepwise between the voltages $V_{Y1}$ and $V_{Y2}$ by the control circuit 28 so that the laser beam spot can be gradually moved by a fine distance on the order of 0.01 μm along the scanning plane 26 in the direction of the coordinate axis Y, and the voltage $V_{Zn}$ applied to the piezo translator 22 from the driver circuit 24 can be varied stepwise by the control circuit 28 so that the laser beam spot can be gradually moved by a fine distance on the order of 0.01 μm along the scanning plane 26 in the direction of the coordinate axis Z.

Figure 5:
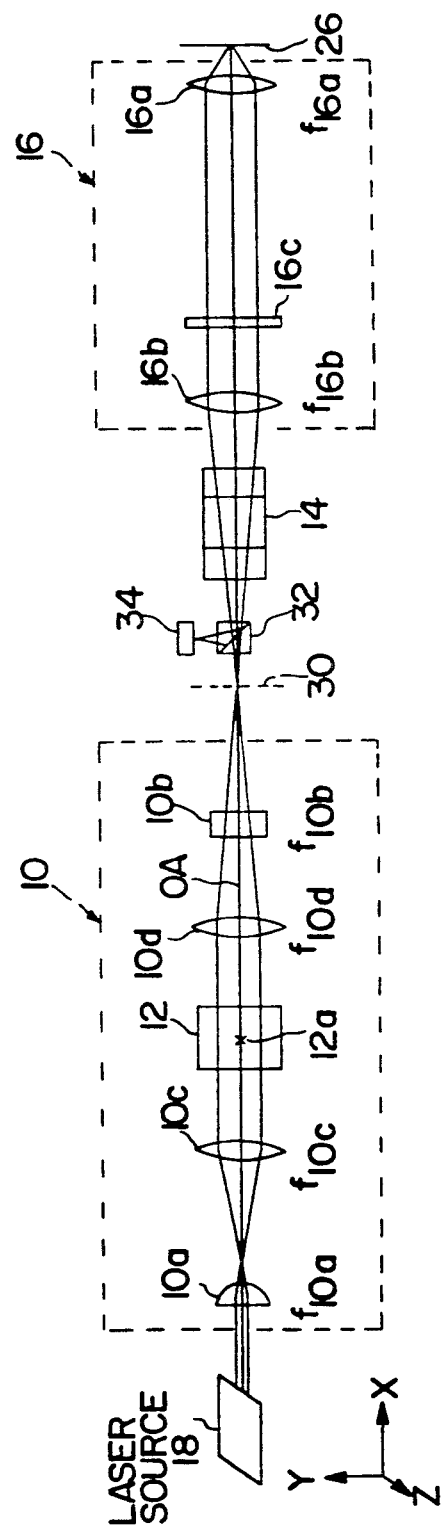
FIG. 5 is a schematic view of the two-dimensional optical scanning system of FIG. 1.

Referring to FIG. 5, the two-dimensional optical scanning system of FIG. 1 is shown in more detail, and is adapted to be incorporated into an optical measurement apparatus as disclosed in British Patent No. 2,147,097 and U.S. patent appliation Ser. No. 014,619 and Ser. No. 151,699. Note, in the optical system of FIG. 5, the acoustic-optical device 12 and the dove prism 14 are set in such a manner that the laser beam is not deflected thereby.

The first optical system 10 includes cylindrical lenses 10a and 10b having focal lengths of $f_{10a}$ and $f_{10b}$, respectively, which are equal to each other, and convex lenses 10c and 10d having focal lengths of $f_{10c}$ and $f_{10d}$, respectively; these lenses being disposed along the optical axis OA as shown in FIG. 5. Note, a cylindrical face of the lens 10a has a generatix perpendicular to the first plane (X, Y), and a cylindrical face of the lens 10b has a generatix perpendicular to the second plane (X, Z). The cylindrical lens 10a deforms the laser beam into a sheet-like shape which lies in parallel with the first plane (X, Y), so that the sheet-like laser beam can be effectively deflected by the acoustic-optical device 12, with the sheet-like laser beam being focussed in the second plane (X, Z) on a center 12a of the transparent medium of the acoustic-optical device 12. The sheet-like laser beam emitted from the acoustic-optical device 12 is returned to the original round shape in cross section by the convex lens 10d and the cylindrical lens 10b, the laser beam being focussed on a plane 30 which is in parallel with a third plane defined by the coordinate axes Y and Z.

The laser beam diverges from the plane 30, and then passes through a polarization beam splitter 32 associated with a photo detector 34 such as a PIN-photo diode. The polarization beam splitter 32 and the photo detector 34 form a part of the optical measurement apparatus as mentioned above. The laser beam passing through the polarization beam splitter 32 is incident upon the dove prism 14, and is then received by the second optical system 16. In addition to the object lens 16a, the second optical system 16 further includes a convex lens 16b and a quarter-wave plate 16c, which are disposed along the optical axis OA. The convex lens 16b has a focal length of $f_{16b}$, and converts the laser beam into a parallel laser beam. The parallel laser beam passes through the quarter-wave plate 16c, and is then focussed on the scanning plane 26 by the object lens 16a having a focal length of $f_{16a}$, as mentioned above, so that the laser beam spot is formed on the scanning plane 26. The laser beam reflected at the scanning plane 26 is returned to the polarization beam splitter 32 through the object lens 16a, the quarter-wave plate 16c, the convex lens 16b, and the dove prism 14, and is then detected by the photo detector 34.

When the laser beam is deflected by the acoustic-optical device 12 so as to define an angle of $\theta$ with the optical axis OA, as shown in FIG. 6(a), the deflected laser beam is refracted by the convex lens 10d so that it is in parallel with the optical axis OA. This parallel laser beam is not refracted and deflected by the cylindrical lens 10b and the dove prism 14, respectively, as it travels in the first plane (X, Y) side by side with the optical axis OA. Nevertheless, the parallel laser beam is refracted by the convex lens 16b, and is further refracted by the object lens 16a, so that it again travels along the first plane (X, Y) side by side with the optical axis OA, whereby the laser beam arrives at the scanning plane 26 (not shown in FIG. 6(a)) apart from the optical axis OA by a deflection distance of $D_Y$ in the direction of the coordinate axis Y. In this case, the deflection distance of $D_Y$ is represented by the following formula:

$$D_Y = (f_{16a}/f_{16b}) \times f_{10d} \times \theta$$

According to the acoustic-optical device, it is possible to carry out an angular deflection of the laser beam on the order of $10^{-3}$ m radian, so that the laser beam spot can be moved along the scanning plane 26 by a fine distance on the order of $10^{-3}$ μm.

Further, when the laser beam is deflected by the dove prism 14 so as to be apart from the optical axis OA by a distance of 2h, as shown FIG. 6(b), the deflected laser beam travels along the second plane (X, Z) side by side with the optical axis OA toward the convex lens 16b. The laser beam is refracted by the convex lens 16b, and is further refracted by the object lens 16a so that it again travels along the second plane (X, Z) side by side with the optical axis OA, whereby the laser beam arrives at the scanning plane 26 (not shown in FIG. 6(b)) apart from the optical axis OA by a deflection distance of $D_Z$ in the direction of the coordinate axis Z. In this case, the deflection distance of $D_Z$ is represented by the following formula:

$$D_Z = (f_{16a}/f_{16b}) \times 2h$$

According to the piezo translator 22 for translating the dove prism 14, it is possible to move the dove prism 14 on the order of $10^{-3}$ μm, so that the laser beam spot can be moved along the scanning plane by a fine distance on the order of $10^{-3}$ μm.

With the arrangement of the two-dimensional optical scanning system as mentioned above, it is possible to stepwise deflect the laser beam by a fine distance in two directions perpendicular to each other, and when this two-dimensional scanning system is used in an optical measurement apparatus as disclosed in British Patent No. 2,147,097 and U.S. patent application Ser. No. 014,619 and Ser. No. 151,699, it is possible to quickly measure the dimensions of a fine pattern of a precision component in two directions perpendicular to each other.

Figure 7:
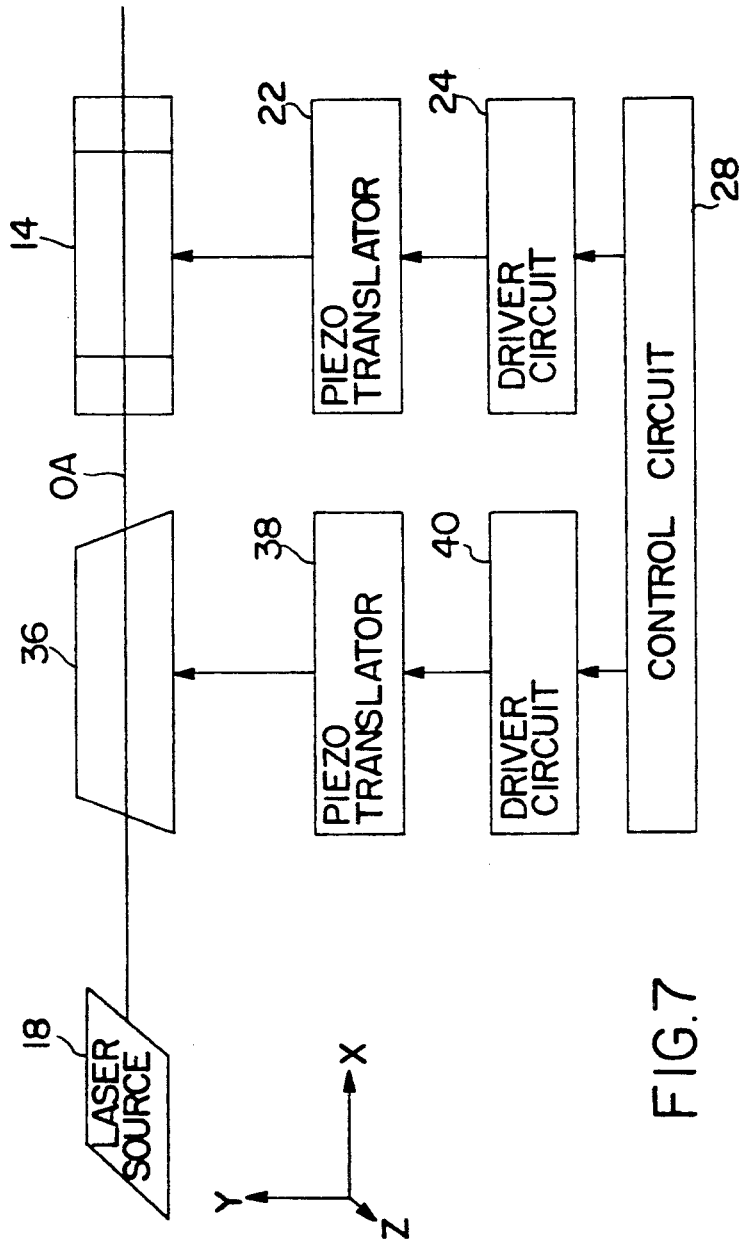
FIG. 7 is a block diagram showing a modification of the two-dimensional optical scanning system of FIG. 1.

FIG. 7 shows a modification of the two-dimensional optical scanning system as shown in FIGS. 1 and 2, in which a dove prism 36 is used in place of the first optical system 10. The dove prism 36 is disposed along the optical axis OA, and can be moved in the direction of the coordinate axis Y so that the laser beam can be deflected in the first plane (X, Y). Namely, the dove prism 36 is moved stepwise by a piezo translator 38 which is actuated by applying a voltage thereto from a driver circuit 40 in the same manner as in the dove prism 14. Note, this piezo translator 38 may be also a Model DPT/AX100.

Figure 8:
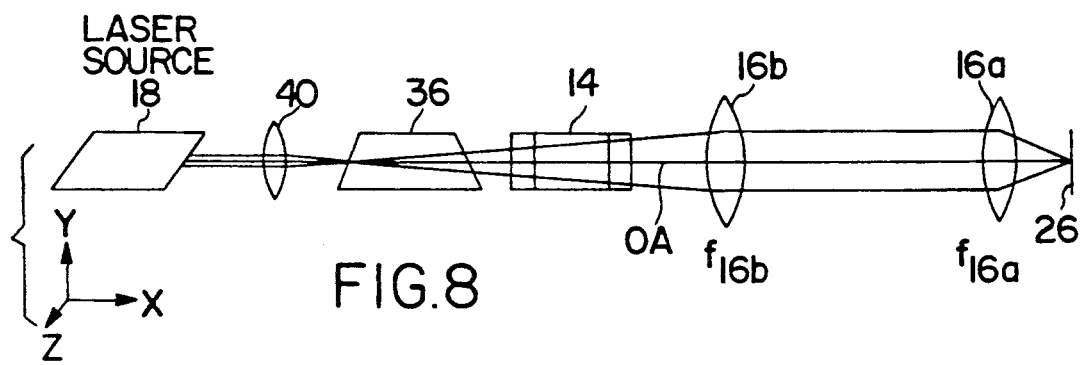
FIG. 8 is a schematic view of the two-dimensional optical scanning system of FIG. 7.

Referring to FIG. 8, the two-dimensional optical scanning system of FIG. 1 is shown in more detail. Note, in FIG. 8, the laser beam is not deflected by the dove prisms 36 and by the dove prism 14.

In the two-dimensional optical scanning system of FIG. 8, a convex lens 40 is disposed along the optical axis OA between the laser source and the dove prism 36, and focuses the laser beam at a location prior to a position at which it is incident upon the dove prism 36, so that the gradually-diverging laser beam passes through the dove prisms 36 and 14, as shown in FIG. 8. The laser beam emitted from the dove prism 14 is refracted by the convex lens 16b and is converted into a parallel laser beam, which is then refracted by the object lens 16a so as to be focussed on the scanning plane 26. When the optical scanning system of FIG. 8 is used in an optical measurement apparatus as disclosed in British Patent No. 2,147,097 and U.S. patent application Ser. No. 014,619 and Ser. No. 151,699, the polarization beam splitter, the photo detector, and the quarter-wave plate are incorporated therein.

Figure 9A:
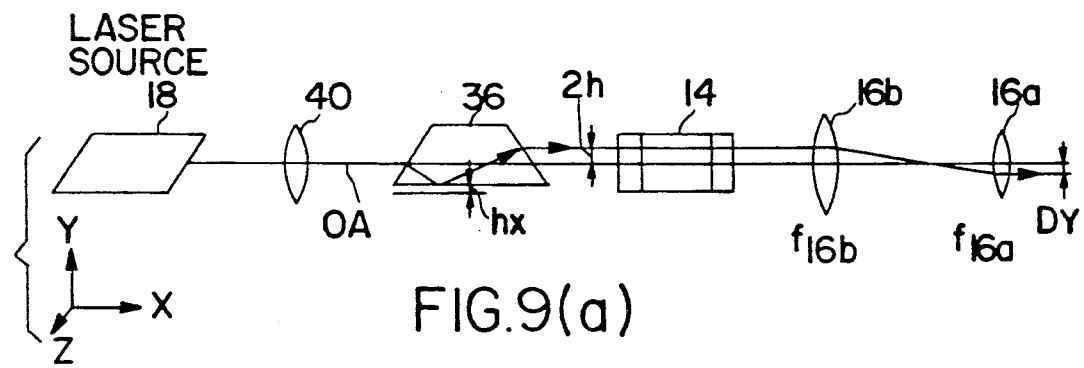
FIGS. 9(a) and 9(b) are schematic views showing a fine two-dimensional deflection of the laser beam in the two-dimensional optical scanning system of FIG. 8.

When the laser beam is deflected by the dove prism 36 so as to be apart from the optical axis OA by a distance of 2h, as shown FIG. 9(a), the deflected laser beam travels along the first plane (X, Y) side by side with the optical axis OA toward the convex lens 16b through the dove prism 14. Note, the laser beam is not deflected by the dove prism 14 because it is only deflected in the first plane (X, Y), and because the dove prism 14 is held at a given position. The deflected laser beam is refracted by the convex lens 16b, and is further refracted by the object lens 16a so that it again travels along the first plane (X, Y) side by side with the optical axis OA, whereby the laser beam arrives at the scanning plane 26 (not shown in FIG. 9(a)) apart from the optical axis OA by a deflection distance of $D_Y$ in the direction of the coordinate axis Y. In this case, the deflection distance of $D_Y$ is represented by the following formula:

$$D_Y = (f_{16a}/f_{16b}) \times 2h$$

Figure 9B:
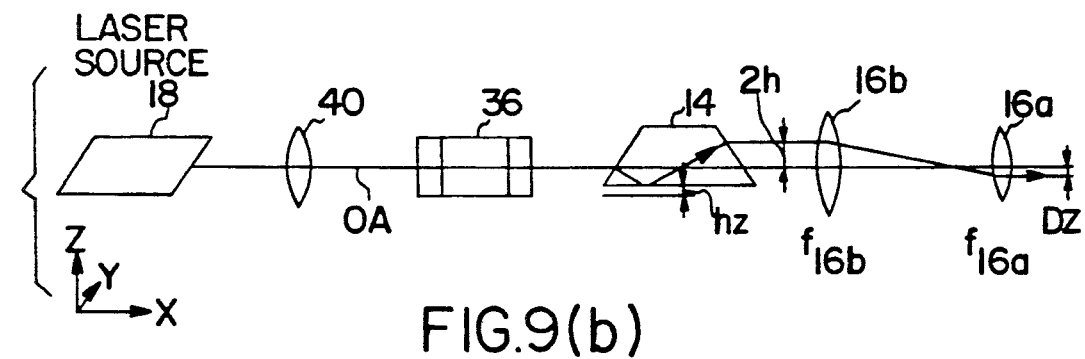

Further, when the laser beam is deflected by the dove prism 14 so as to be apart from the optical axis OA by a distance of 2h, as shown FIG. 9(b), the deflected laser beam travels along the second plane (X, Z) side by side with the optical axis OA toward the convex lens 16b. The deflected laser beam is refracted by the convex lens 16b, and is further refracted by the object lens 16a so that it again travels along the second plane (X, Z) side by side with the optical axis OA, whereby the laser beam arrives at the scanning plane 26 (not shown in FIG. 9(b)) apart from the optical axis OA by a deflection distance of $D_Z$ in the direction of the coordinate axis Z. In this case, the deflection distance of $D_Z$ is represented by the following formula:

$$D_Z = (f_{16a}/f_{16b}) \times 2h$$

With the arrangement of the two-dimensional optical scanning system as shown in FIG. 8, it is also possible to stepwise deflect the laser beam by a fine distance in two directions perpendicular to each other.

Figure 10:
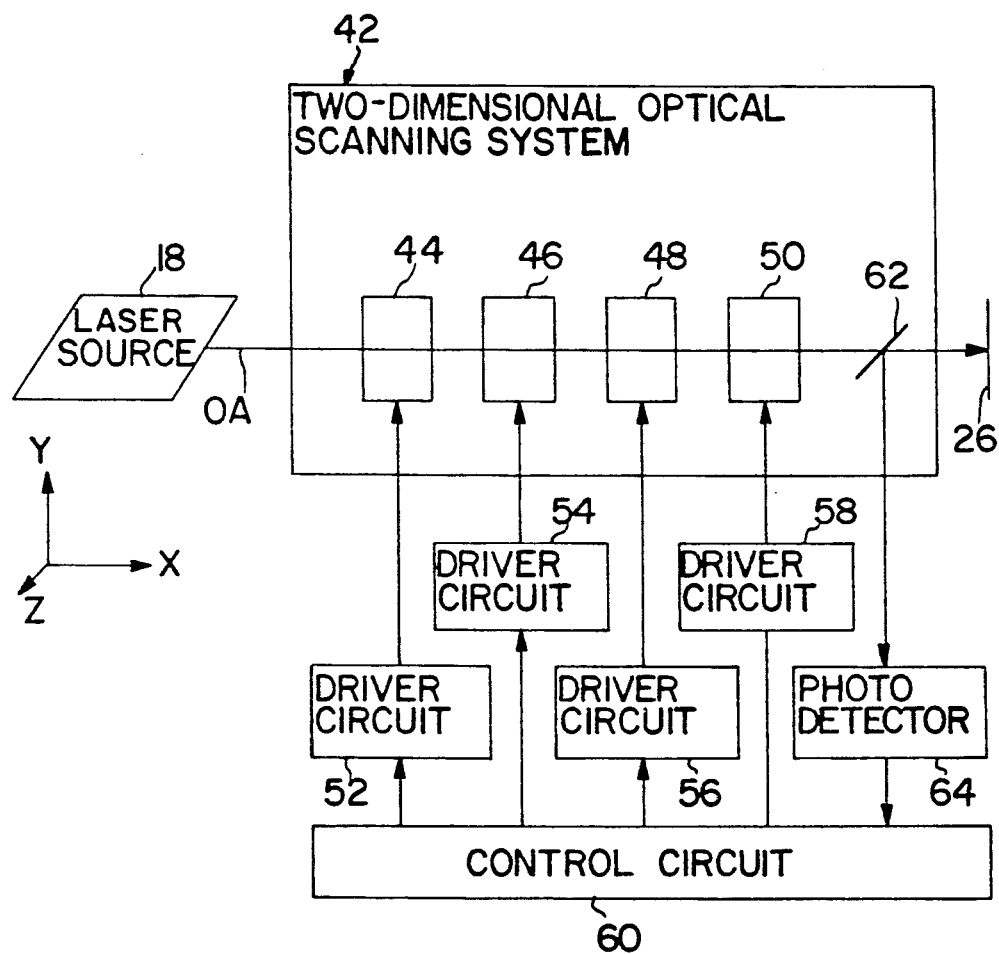
FIG. 10 is a block diagram showing another embodiment of the two-dimensional optical scanning system according to the present invention.

FIG. 10 is a block diagram of another embodiment of the two-dimensional optical scanning system according to the present invention, which is generally indicated by a reference numeral 42. This optical scanning system 42 is incorporated into an optical measurement apparatus as disclosed in British Patent No. 2,147,097 and U.S. patent application Ser. No. 014,619 and Ser. No. 151,699. The two-dimensional optical scanning system 42 comprises first, second, third, and fourth light deflection means 44, 46, 48 and 50, which are disposed along the optical axis OA thereof. Note, in this embodiment, the optical axis OA also is in accordance with the coordinate axis X of the three-dimensional coordinate system (X, Y, Z) shown in FIG. 10.

The first and second light deflection means 44 and 46 each includes a fine-optical deflector which can stepwise deflect a light beam for a fine distance. Such a fine-optical deflector may be the acoustic-optical device, the dove prism with the piezo translator, or the like as mentioned above. In this embodiment, the first light deflection means 44 stepwise and finely deflects the laser beam along the first plane (X, Y), and the second deflection means 46 stepwise and finely deflects the laser beam along the second plane (X, Z). Accordingly, by the first and second light deflection means 44 and 46, a fine area included in the scanning plane 26 is two-dimensionally and finely scanned by the laser beam emitted from the laser source 18 in the same manner as in the foregoing embodiments.

The third and fourth light deflection means 48 and 50 each includes a coarse-optical deflector which can stepwise deflect a light beam for a coarse distance. Such a coarse optical deflector may be a galvano mirror, a magnetic mirror or the like; the galvano mirror and the magnetic mirror being well known in this field. The third and fourth light deflection means 48 and 50 are arranged so as to carry out the coarse deflection of the laser beam along the first plane (X, Y) and the second plane (X, Z), respectively, whereby a two-dimensional coarse scan can be carried out on the scanning plane. Namely, the fine area which is scanned along the scanning plane 26 by the laser beam with the first and second light deflection means 44 and 46 is encompassed by an area which is scanned along the scanning plane 26 by the laser beam with the third and fourth light deflection means 48 and 50.

As shown in FIG. 10, the first, second, third and fourth light deflection means 44, 46, 48 and 50 are actuated by driver circuits 52, 54, 56, and 58, respectively, which are controlled by a control circuit 60 including a microprocessor. Namely, each of the driver circuits 52, 54, 56 and 58 feeds a driver signal to the corresponding light deflection means 44, 46, 48, 50 under the control of the control circuit 60, whereby the laser beam is suitably deflected as a reflection intensity datum by each of the first, second, third and fourth light deflection means 44, 46, 48 and 50.

The two-dimensional optical scanning system 42 further comprises a polarization beam splitter 62 by which a laser beam reflected from the scanning plan 26 is directed to a photo detector 64. The photo detector 64 detects a light intensity of the reflected laser beam, which is fetched by the control circuit 60.

As stated hereinafter, when a precision component such as an integrated circuit, a magnetic head or the like is put in the scanning plane 26, the third and fourth light deflection means 48 and 50 are actuated to coarsely scan the precision component by the laser beam to seek a position of a fine pattern included in the precision component, and the first and second light deflection means are then actuated to finely scan the fine pattern of the precision component by the laser beam, to measure a dimension of the fine pattern.

In the two-dimensional optical system as shown in FIG. 10, although the first, second, third and fourth light deflection means 44, 46, 48 and 50 are successively disposed along the optical axis OA toward the scanning plan 26, this disposition can be changed, if necessary.

Figure 11:
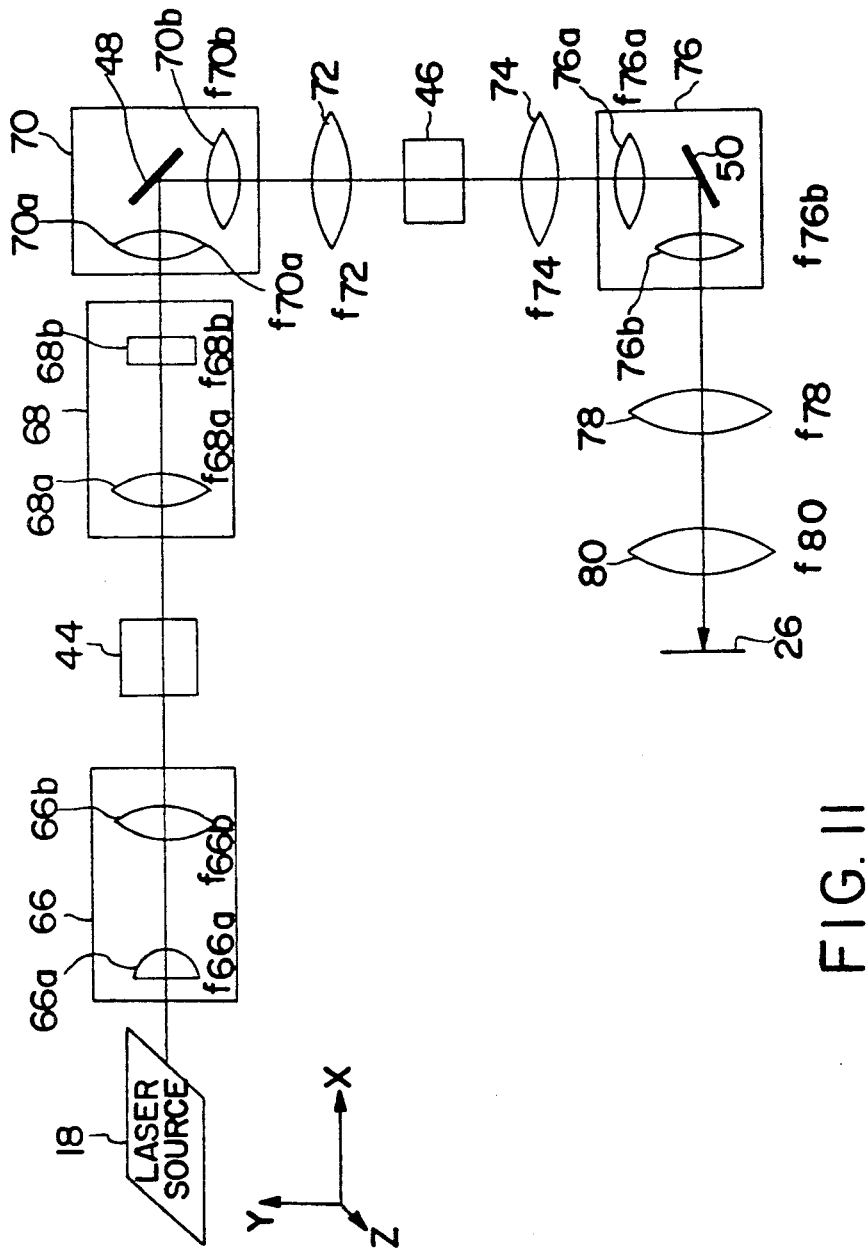
FIG. 11 is a schematic view of the two-dimensional optical scanning system of FIG. 10.

Referring to FIG. 11, the two-dimensional optical scanning system 42 of FIG. 10 is shown in more detail. In FIG. 11, the first light deflection means 44 is an acoustic-optical device such as a Model ADM-40, the second light deflection means 46 is an acoustic-optical device of another type commercially available from IntraAction Corp. as AOM-40, and the third and fourth light deflection means 48 and 50 are galvano mirrors used as the coarse-optical deflectors.

As shown in FIG. 11, the two-dimensional optical scanning system 42 comprises a first optical system 66 disposed between the laser source 18 and the first light deflection means 44, and including a cylindrical lens 66a having a focal length of $f_{66a}$, and a convex lens 66b of a focal length of $f_{66b}$. The first optical system 66 converts the laser beam into a sheet-like spread laser beam so that it can be effectively deflected in the first planee (X, Y) by the first light deflection means or acoustic-optical device (Model ADM-40) 44. The optical scanning system 42 also comprises a second optical system 68 disposed between the acoustic-optical device 44 and the third light deflection means 48, and including a convex lens 68a having a focal length of $f_{68a}$ (equal to $f_{66b}$), and a cylindrical lens 68b having a focal length of $f_{68b}$ (equal to $f_{66a}$). The second optical system 68 returns the laser beam to the original round shape in cross section.

The third light deflection means or galvano mirror 48 forms a third optical system 70 together with two convex lenses 70a and 70b, which have focal lengths of $f_{70a}$ and $f_{70b}$, respectively, and are disposed so that they have a common focal point. The galvano mirror 48 stepwise and coarsely deflects the laser beam in the first plane (X, Y). The laser beam emitted from the convex lens 70b is refracted by a convex lens 72 having a focal length of $f_{72}$, and is then incident upon the second light deflection means or acoustic-optical device (Model AOM-40) 46. This type of acoustic-optical device is different from the acoustic-optical device 44 (Model ADM-40) in that, in Model AOM-40, the laser beam can be effectively deflected without converting the round shape thereof into a sheet-like shape. The acoustic-optical device 46 stepwise and finely deflects the laser beam along the second plane (X, Z). The laser beam emitted from the acoustic-optical device is then refracted by a convex lens 74 having a focal length of $f_{74}$.

The fourth light deflection means or galvano mirror 50 forms a fourth optical system 76 together with two convex lenses 76a and 76b having focal lengths of $f_{76a}$ and $f_{70b}$, respectively, and disposed so that they have a common focal point. The galvano mirror 50 stepwise and coarsely deflects the laser beam along the second plane (X, Z). The laser beam emitted from the convex lens 76b is refracted by a convex lens 78 having a focal length of $f_{78}$, and is then refracted by an object lens 80 having a focal length of $f_{80}$, so that the laser beam is focussed to form a laser beam spot on the scanning plan 26.

When the laser beam is deflected by the acoustic-optical device 44 so as to define an angle of $\theta_{Y1}$ with the optical axis OA in the first plan (X, Y), as shown in FIG. 12(a), the deflected laser beam is refracted by the convex lens 68a of the second optical system 68 so that it is in parallel with the optical axis OA. This parallel laser beam is not refracted by the cylindrical lens 68b because it travels along the first plane (X, Y) side by side with the optical axis OA. The laser beam is then incident upon the third optical system 70 so that it is reflected by the galvano mirror 48 thereof, but the laser beam is not virtually deflected thereby, because the galvano mirror 48 is set at a given position. Accordingly, the laser beam passes through the third optical system 70 along the first plane (X, Y) side by side with the optical axis OA. The laser beam emitted from the third optical system 70 is refracted by the convex lens 72, and is then incident upon the acoustic-optical device 46, but the laser beam is not virtually deflected by the acoustic-optical device 46 because a voltage applied thereto is maintained at a given level. The laser beam emitted from the acoustic-optical device 46 is refracted by the convex lens 74 so as to be in parallel with the optical axis OA, and is then incident upon the fourth optical system 76, but the parallel laser beam is not virtually deflected by the galvano mirror 50 of the fourth optical system 76 for the same reason as for the galvano mirror 48. The laser beam emitted from the fourth optical system 76 is refracted by the convex lens 78, and is further refracted by the object lens 80, so that it travels along the first plane (X, Y) side by side with the optical axis OA, whereby the laser beam arrives at the scanning plane 26 (not shown in FIG. 12(a)) apart from the optical axis OA by a deflection distance of $D_{Y1}$ in the direction of the coordinate axis Y. In this case, the deflection distance of $D_{Y1}$ is represented by the following formula:

$$D_{Y1} = (f_{68a} \cdot f_{74} \cdot f_{80} \cdot \theta_{Y1})/(f_{72} \cdot f_{78})$$

When the laser beam is deflected by the galvano mirror 48 so as to define an angle of $\theta_{Y2}$ with the optical axis OA in the first plane (X, Y), as shown in FIG. 12(b), the deflected laser beam is refracted by the convex lens 70b of the third optical system 70 so that it is in parallel with the optical axis OA. Note, in FIG. 12(b), when the laser beam passes through the acoustic-optical device 44, it is not virtually deflected thereby because a voltage applied to the acoustic-optical device 44 is maintained at a given level. The parallel laser beam emitted from the third optical system 70 is refracted by the convex lens 72, and is then incident upon the acoustic-optical device 46, but the laser beam is not virtually deflected by the acoustic-optical device 46 for the reason mentioned above. The laser beam emitted from the acoustic-optical device 46 is refracted by the convex lens 74 so as to be in parallel with the optical axis OA, and is then incident upon the fourth optical system 76, but the parallel laser beam is not virtually deflected by the galvano mirror 50 of the fourth optical system 76 for the reason mentioned above. The laser beam emitted from the fourth optical system 76 is refracted by the convex lens 78, and is further refracted by the object lens 80, so that it travels along the first plane (X, Y) side by side with the optical axis OA, whereby the laser beam arrives at the scanning plane 26 (not shown in FIG. 12(b)) apart from the optical axis OA by a deflection distance of $D_{Y2}$ in the direction of the coordinate axis Y. In this case, the deflection distance of $D_{Y2}$ is represented by the following formula:

$$D_{Y2} = (f_{70b} \cdot f_{74} \cdot f_{80} \cdot \theta_{Y2})/(f_{72} \cdot f_{78})$$

As apparent from the above description, the first light deflection means or acoustic-optical device 44 is used to carry out the fine-stepwise scan in the direction of the coordinate axis Y, whereas the third light deflection means or galvano mirror 48 is used to carry out the coarse-stepwise scan in the same direction. In this case, a ratio of a coarse-stepwise scan pitch to a fine-stepwise scan pitch is shown as follows:

$$D_{Y2}/D_{Y1} = f_{70b} \cdot \theta_{Y2}/f_{68a} \cdot \theta_{Y1}$$

Further, when the laser beam is deflected by the acoustic-optical device 46 so as to define an angle of $\theta_{Z1}$ with the optical axis OA in the second plane (X, Z), as shown in FIG. 12(c), the deflected laser beam is refracted by the convex lens 74 so that it is in parallel with the optical axis OA. This parallel laser beam passes through the fourth optical system 76 without being virtually deflected by the galvano mirror 50 of the fourth optical system 76 for the reason mentioned above. The laser beam emitted from the fourth optical system 76 is refracted by the convex lens 78, and is further refracted by the object lens 80, so that it travels along the second plane (X, Z) side by side with the optical axis OA, whereby the laser beam arrives at the scanning plan 26 (not shown in FIG. 12(c)) apart from the optical axis OA by a deflection distance of $D_{Z1}$ in the direction of the coordinate axis Z. In this case, the deflection distance of $D_{Z1}$ is represented by the following formula:

$$D_{Z1} = (f_{74} \cdot f_{80} \cdot \theta_{Z1})/f_{78}$$

When the laser beam is deflected by the galvano mirror 50 so as to define an angle of $\theta_{Z2}$ with the optical axis OA along the second plane (X, Z), as shown in FIG. 12(d), the deflected laser beam is refracted by the convex lens 76b so that it is in parallel with the optical axis OA. This parallel laser beam is refracted by the convex lens 78, and is further refracted by the object lens 80, so that it travels along the second plane (X, Z) side by side with the optical axis OA, whereby the laser beam arrives at the scanning plane 26 (not shown in FIG. 12(d)) apart from the optical axis OA by a deflection distance of $D_{Z2}$ in the direction of the coordinate axis Z. In this case, the deflection distance of $D_{Z2}$ is represented by the following formula:

$$D_{Z2} = (f_{76b} \cdot f_{80} \cdot \theta_{Z2})/f_{78}$$

As apparent from the above description, the second light deflection means or acoustic-optical device 46 is used to carry out the fine-stepwise scan in the direction of the coordinate axis Z, whereas the fourth light deflection means or galvano mirror 50 is used to carry out the coarse-stepwise scan in the same direction. In this case, a ratio of a coarse-stepwise scan pitch to a fine-stepwise scan pitch is shown as follows:

$$D_{Z2}/D_{Z1} = f_{76b} \cdot \theta_{Z2}/f_{74} \cdot \theta_{Z1}$$

Figure 13:
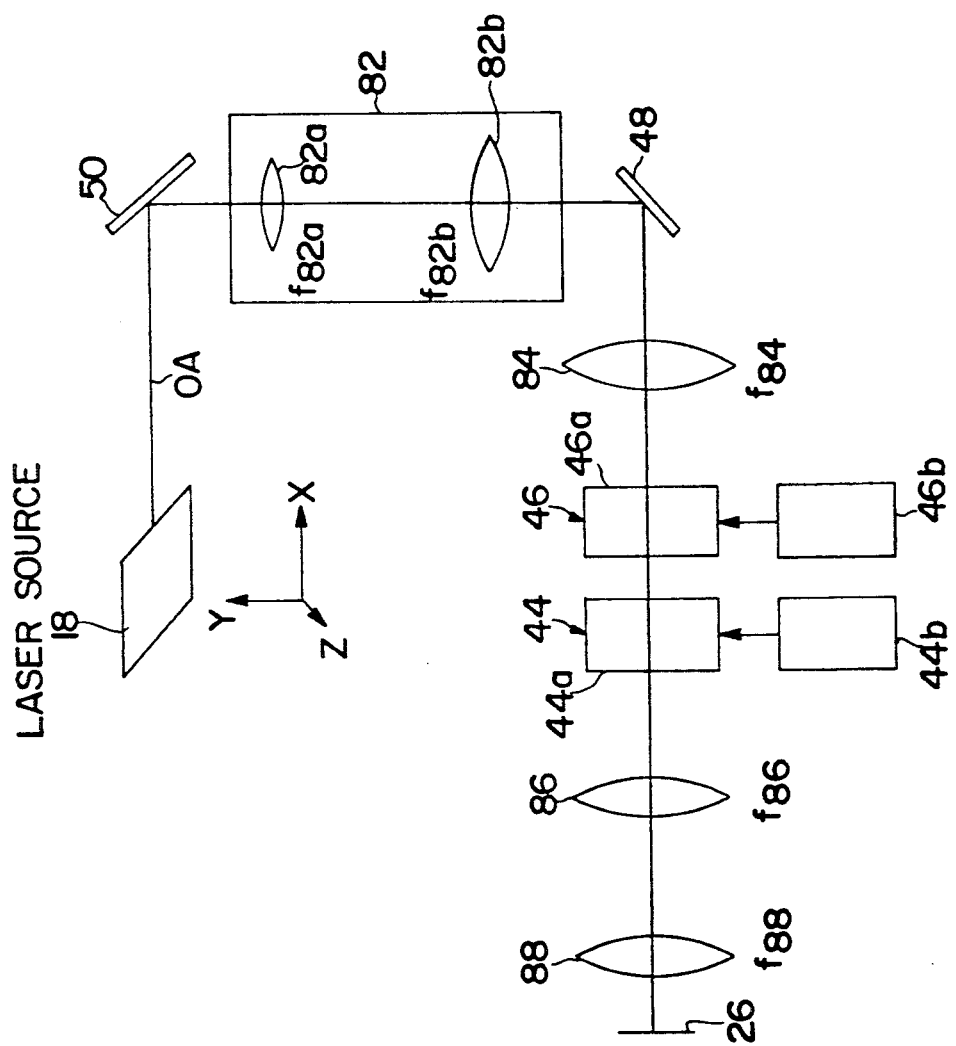
FIG. 13 is a block diagram showing a modification of the two-dimensional optical scanning system of FIG. 11.

FIG. 13 shows a modification of the two-dimensional optical scanning system as shown in FIGS. 10 and 11, in which the first and second light deflection means 44 and 46 comprise a dove prism 44a coupled to a piezo translator 44b and a dove prism 46a coupled to a piezo translator 46b, respectively, and in which the third and fourth light deflection means 48 and 50 are galvano mirrors used as the coarse-optical deflectors. Note, the piezo translators 44b and 46b also may be Model DPT/AX100.

This modified two-dimensional optical scanning system comprises an optical system 82 disposed along the optical axis OA between the fourth light deflection means or galvano mirror 50 and the third light deflection means or galvano mirror 48, and including two convex lenses 82a and 82b having focal lengths of $f_{82a}$ and $f_{82b}$, respectively. The galvano mirrors 50 and 48 stepwise and coarsely deflect the laser beam in the second plane (X, Z) and the first plane (X, Y), respectively. The two-dimesional optical scanning system also comprises a convex lens 84 having a focal length of $f_{84}$ and disposed between the galvano mirror 48 and the dove prism 46a. The dove prism 46a is moved stepwise and finely by the piezo translator 46b along the direction of the coordinate axis Z, so that the laser beam is stepwise and finely deflected along the second plane (X, Z). The scanning system further comprises a convex lens 86 and an object lens 88 having focal lengths of $f_{86}$ and $f_{88}$, respectively, and disposed between the dove prism 44a and the scanning plan 26. The dove prism 44a is moved stepwise and finely by the piezo translator 44b along the direction of the coordinate axis Y, so that the laser beam is stepwise and finely deflected along the first plane (X, Y).

Figure 14:
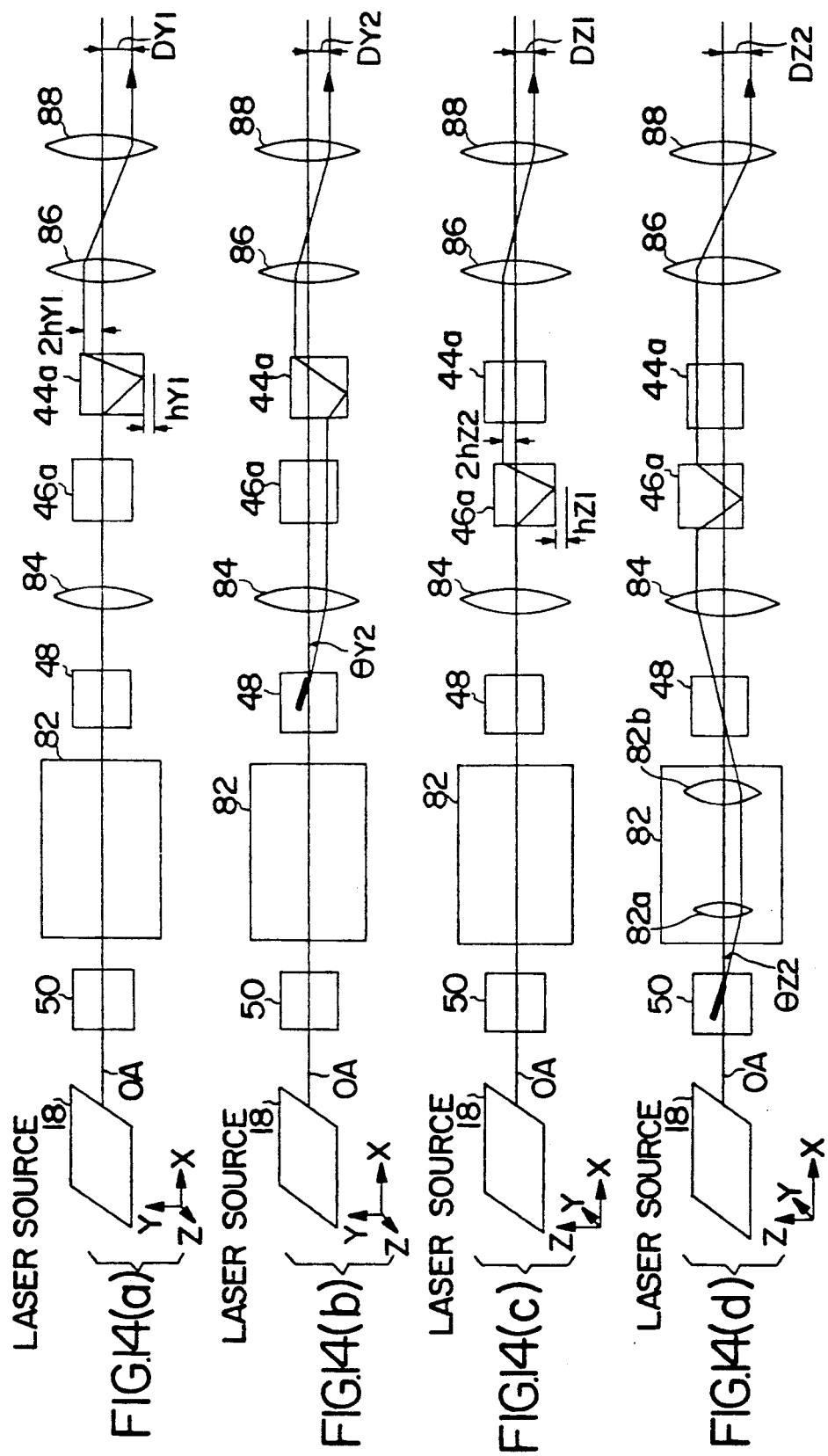
FIGS. 14(a) to 14(d) are schematic views showing fine and coarse two-dimensional deflections in the two-dimensional optical scanning system of FIG. 13.

When the laser beam is deflected by the dove prism 44a so as to be apart from the optical axis OA by a distance of $2h_{Y1}$, as shown FIG. 14(a), the deflected laser beam travels along the first plane (X, Y) side by side with the optical axis OA toward the convex lens 86. Note, the laser beam is not virtually deflected by the galvano mirrors 50 and 48 and by the dove prism 46a for the reasons mentioned above. The laser beam is refracted by the convex lens 86, and is further refracted by the object lens 88 so that it again travels along the first plane (X, Y) side by side with the optical axis OA, whereby the laser beam arrives at the scanning plane 26 (not shown in FIG. 14(a)) apart from the optical axis OA by a deflection distance of $D_{Y1}$ in the direction of the coordinate axis Y. In this case, the deflection distance of $D_{Y1}$ is represented by the following formula:

$$D_{Y1} = (f_{88}/f_{86}) \times 2h_{Y1}$$

When the laser beam is deflected by the galvano mirror 48 so as to define an angle of $\theta_{Y2}$ with the optical axis OA along the first plane (X, Y), as shown in FIG. 14(b), the deflected laser beam is refracted by the convex lens 84 so that it is in parallel with the optical axis OA. This parallel laser beam substantially travels along the first plane (X, Y) side by side with the optical axis OA toward the convex lens 86 without being virtually deflected by the dove prisms 46a and 44a. The laser beam is refracted by the convex lens 86, and is further refracted by the object lens 88, so that it again travels along the first plane (X, Y) side by side with the optical axis OA, whereby the laser beam arrives at the scanning plan 26 (not shown in FIG. 12(b)) apart from the optical axis OA by a deflection distance of $D_{Y2}$ in the direction of the coordinate axis Y. In this case, the deflection distance of $D_{Y2}$ is represented by the following formula:

$$D_{Y2} = 2 \cdot f_{84} \cdot f_{88} \cdot \theta_{Y2}/f_{86}$$

Further, when the laser beam is deflected by the dove prism 46a so as to be apart from the optical axis OA by a distance of $2h_{Z1}$, as shown in FIG. 14(c), the deflected laser beam travels along the second plane (X, Z) side by side with the optical axis OA toward the convex lens 86 without being virtually deflected by the dove prism 44a. Accordingly, the laser beam is refracted by the convex lens 86, and is further refracted by the object lens 88 so that it again travels along the second plane (X, Z) side by side with the optical axis OA, whereby the laser beam arrives at the scanning plane 26 (not shown in FIG. 14(c)) apart from the optical axis OA by a deflection distance of $D_{Z1}$ in the direction of the coordinate axis Z. In this case, the deflection distance of $D_{Z1}$ is represented by the following formula:

$$D_{Z1} = (f_{88}/f_{86}) \times 2h_{Z1}$$

When the laser beam is deflected by the galvano mirror 50 so as to define an angle of $\theta_{Z2}$ with the optical axis OA along the second plane (X, Z), as shown in FIG. 14(d), the deflected laser beam is refracted by the convex lens 82a of the optical system 82 so as to be in parallel with the optical axis OA. This parallel laser beam is also reflected by the convex lens 82b of the optical system 82 so that it is incident upon the galvano mirror 48. The laser beam is reflected by the galvano mirror 48, but it is not virtually reflected thereby for the reason mentioned above. The laser beam reflected by the galvano mirror 48 is refracted by the convex lens 84 so as to be in parallel with the optical axis OA. This parallel laser beam substantially travels along the second plane (X, Z) side by side with the optical axis OA toward the convex lens 86 without being virtually deflected by the dove prisms 46a and 44a. Accordingly, the laser beam is refracted by the convex lens 86, and is further refracted by the object lens 88, so that it travels along the second plane (X, Z) side by side with the optical axis OA, whereby the laser beam arrives at the scanning plane 26 (not shown in FIG. 12(d)) apart from the optical axis OA by a deflection distance of $D_{Z2}$ in the direction of the coordinate axis Z. In this case, the deflection distance of $D_{Z2}$ is represented by the following formula:

$$D_{Z2} = 2 \cdot f_{82a} \cdot f_{84} \cdot f_{88} \cdot \theta_{Z2}/(f_{82b} \cdot f_{86})$$

Figure 15:
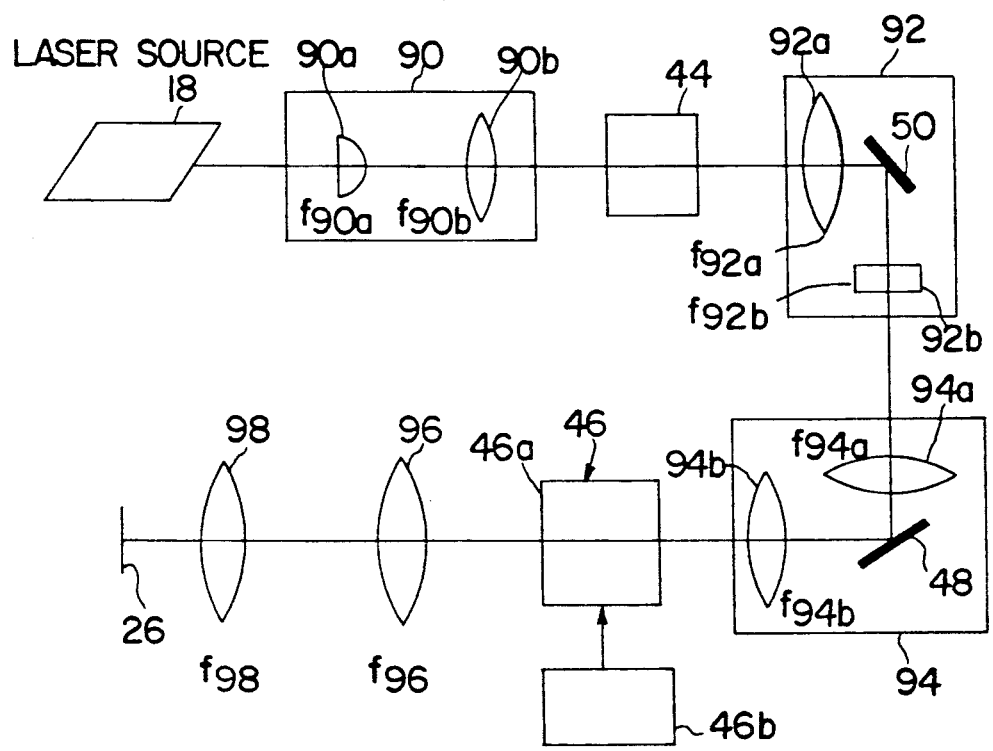
FIG. 15 is a block diagram showing another modification of the two-dimensional optical scanning system of FIG. 11.

FIG. 15 shows another modification of the two-dimensional optical scanning system as shown in FIGS. 10 and 11, in which the first and second light deflection means 44 and 46 comprise an acoustic-optical device such as a Model ADM-40 and a dove prism 46a coupled to a piezo translator 46b, respectively, and in which the third and fourth light deflection means 48 and 50 are galvano mirrors used as the coarse-optical deflectors.

This modified two-dimensional optical scanning system comprises a first optical system 90 disposed between the laser source 18 and the first light deflection means or acoustic-optical device (Model ADM-40) 44, and including a cylindrical lens 90a having a focal length of $f_{90a}$, and a convex lens 90b having a focal length of $f_{90b}$. The first optical system 90 corresponds to the first optical system 66 of FIG. 11, and the acoustic-optical device is used to carry out a fine deflection of the laser beam along the first plane (X, Y). The fourth light deflection means or galvano mirror 50 forms a second optical system 92 together with a convex lens 92a and a cylindrical lens 92b which have focal lengths of $f_{92a}$ and $f_{92b}$, respectively, and which corresponds to the fourth optical system 76 of FIG. 11. Namely, the galvano mirror 50 is used to carry out a coarse deflection of the laser beam along the second plane (X, Z). The third light deflection means or galvano mirror 48 forms a third optial system 94 together with two convex lenses 94a and 94b which have focal lengths of $f_{94a}$ and $f_{94b}$, respectively, and which correspond to the fourth optical system 70 of FIG. 11. Namely, the galvano mirror 48 is used to carry out a coarse deflection of the laser beam along the first plane (X, Y). The second light deflection means 46 including the dove prism 46a coupled to the piezo translator 46b carries out a fine deflection of the laser beam along the second plane (X, Z) in the same manner as in FIG. 13. A convex lens 96 and an object lens 98 are disposed between the dove prism 46b and the scanning plan 26, and have focal lengths of $f_{96}$ and $f_{98}$, respectively.

Figure 16:
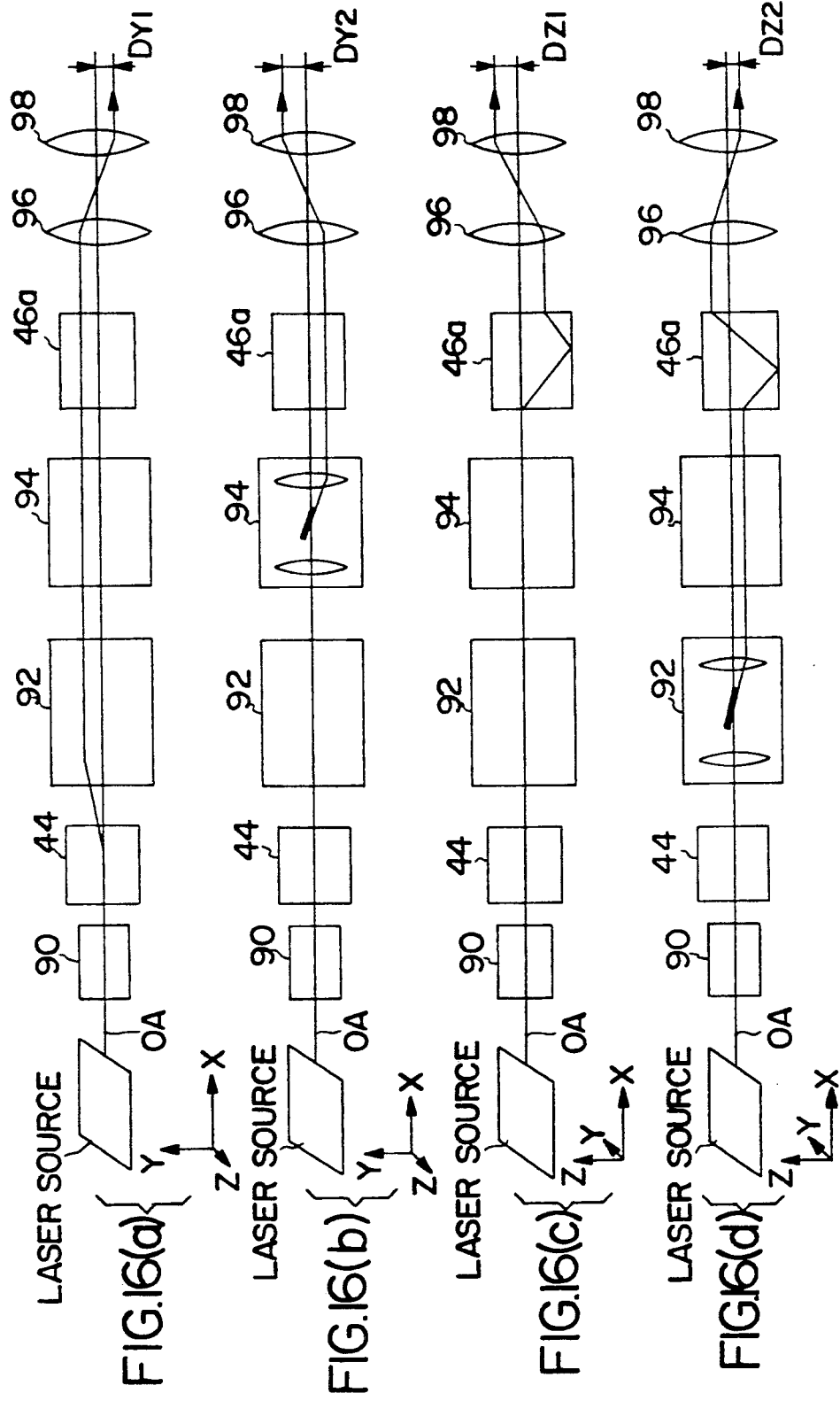
FIGS. 16(a) to 16(d) are schematic views showing fine and coarse two-dimensional deflections in the two-dimensional optical scanning system of FIG. 15.

As shown in FIG. 16(a), when the laser beam is deflected by the acoustic-optical device 44 so as to define an angle of $\theta_{Y1}$ with the optical axis OA in the first plane (X, Y), the laser beam is spaced apart from the optical axis OA by a deflection distance of $D_{Y1}$ along the scanning plane 26 (not shown in FIG. 16(a)) in the direction of the coordinate axis Y. In this case, the deflection distance of $D_{Y1}$ is represented by the following formula:

$$D_{Y1} = (f_{92a} \cdot f_{98} \cdot \theta_{Y1}) / f_{96}$$

As shown in FIG. 16(b), when the laser beam is deflected by the galvano mirror 48 so as to define an angle of $\theta_{Y2}$ with the optical axis OA, the laser beam is spaced apart from the optical axis OA by a deflection distance of $D_{Y2}$ along the scanning plane 26 (not shown in FIG. 16(b)) in the direction of the coordinate axis Y. In this case, the deflection distance of $D_{Y2}$ is represented by the following formula:

$$D_{Y2} = (f_{94b} \cdot f_{98} \cdot f_{88} \cdot \theta_{Y2}) / f_{96}$$

As shown in FIG. 16(c), when the laser beam is deflected by the dove prism 46b so as to be apart from the optical axis OA by a distance of $2h_{Z1}$, the laser beam is spaced apart from the optical axis OA by a deflection distance of $D_{Z1}$ along the scanning plane 26 (not shown in FIG. 16(c)) in the direction of the coordinate axis Z. In this case, the deflection distance of $D_{Z1}$ is represented by the following formula:

$$D_{Z1} = (f_{98}/f_{96}) \times 2h_{Z1}$$

As shown in FIG. 16(d), when the laser beam is deflected by the galvano mirror 50 so as to define an angle of $\theta_{Z2}$ with the optical axis OA, the laser beam is spaced apart from the optical axis OA by a deflection distance of $D_{Z2}$ along the scanning plane 26 (not shown in FIG. 16(d)) in the direction of the coordinate axis Z. In this case, the deflection distance of $D_{Z2}$ is represented by the following formula:

$$D_{Z2} = 2 f_{92b} \cdot f_{98} \cdot \theta_{Z2} / f_{96}$$

Figure 17:
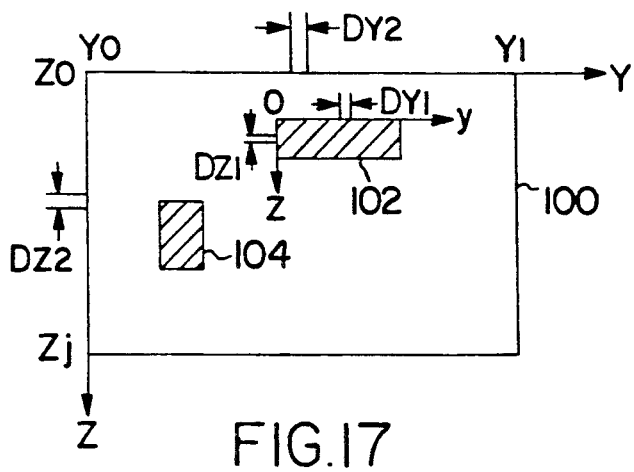
FIG. 17 is a diagrammatic view showing a coarse scan area and fine scan zones included therein which are obtained by the two-dimensional optical scanning system as shown in FIGS. 10 to 17.
Figure 18:
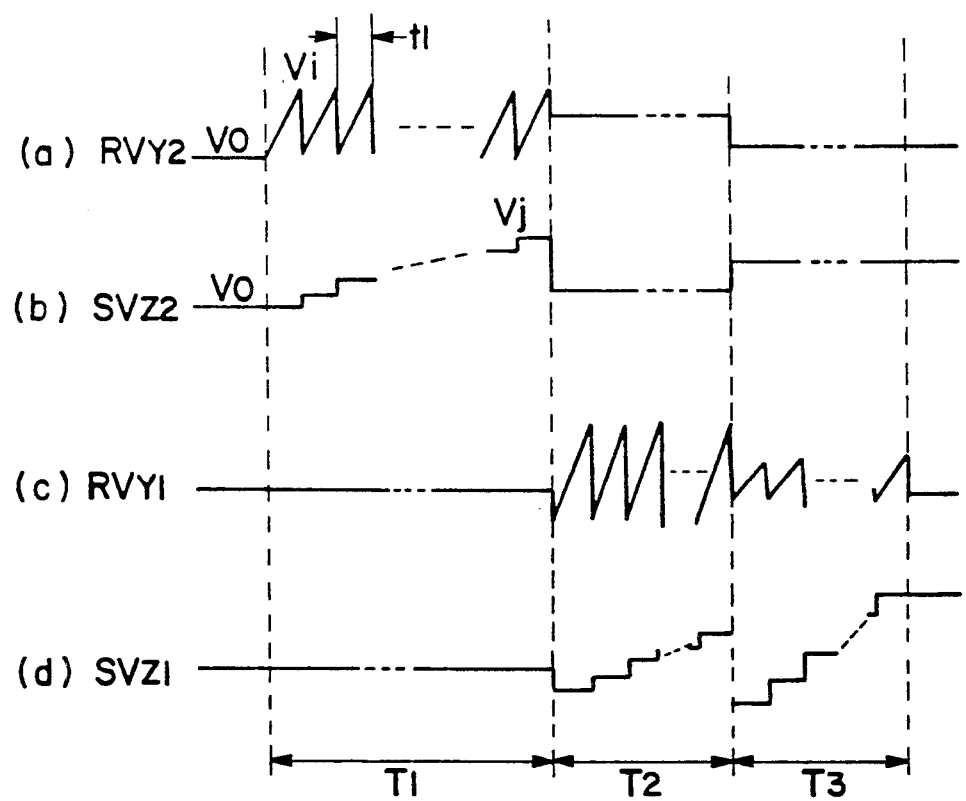
FIG. 18 is a time chart by which the two-dimensional optical scanning system is operated to obtain the coarse scan area and fine scan zones as shown in FIG. 17.

FIG. 17 diagrammatically shows a scan area 100 which can be scanned on the scanning plan 26 with the laser beam, by using the galvano mirrors 48 and 50 as shown in FIGS. 11, 13 and 15, which can be obtained by applying ramp and stepwise voltages $RV_{Y2}$ and $SV_{Z2}$ (FIGS. 18(a) and 18(b)) from the driver circuits 56 and 58 (FIG. 10) to the third and fourth light deflection means or galvano mirrors 48 and 50, respectively, over a period of time $T_1$ (FIG. 18). In particular, when the ramp voltage $RV_{Y2}$ is stepwise and gradually varied from $V_o$ to $V_i$ by $\Delta V_Y$ over a period of time $t_1$, the laser beam spot is moved along the scanning plane 26 from $Y_o$ to $Y_i$. Namely, when the ramp voltage $RV_{Y2}$ is increased by $\Delta V_Y$, the beam spot is moved by a deflection distance $D_{Y2}$ which may be on the order of 0.1 μm. As soon as the ramp voltage $RV_{Y2}$ is increased to $V_i$, it is returned to the level of $V_o$ and the stepwise voltage $SV_{Z2}$ is raised by $\Delta V_Z$, and thus the scan area 100 can be defined along the scanning plane 26 by the galvano mirrors 48 and 50. Note, although the ramp voltage $RV_{Y2}$ and the stepwise voltage $SV_{Z2}$ are varied, the ramp and stepwise voltages $RV_{Y1}$ and $SV_{Z1}$ applied from the driver circuits 52 and 54 to the first and second light deflection means 44 and 46 are maintained at a constant level.

As shown in FIG. 17, the area 100 encompasses fine hatching zones 102 and 104 which can be scanned by the laser beam with the first and second light deflection means 44 and 46. When the fine zone 102 is scanned by the laser beam with the first and second light deflection means 44 and 46 (acoustic-optical device or dove prism), the laser beam is oriented so that the laser beam spot is positioned at an origin 0 of a two-dimensional coordinate system (y, z).

The orientation of laser beam can be carried out by applying a given level of voltage from each of the driver circuits 56 and 58 to the corresponding galvano mirror 48, 50. This also holds true for a scan of the fine zone 104. A two-dimensional scan of the fine zone 102 can be achieved by varying the ramp and stepwise voltages $RV_{Y1}$ and $SV_{Z1}$ over a period of time $T_2$ in the same manner as for the ramp and stepwise voltages $RV_{Y2}$ and $SV_{Z2}$, except that, when the ramp voltage $RV_{Y1}$ is increased by $\Delta V_Y$, the laser beam spot is moved by a deflection distance $D_{Y1}$ which is less than about $D_{Y2}/10$, and that, when the stepwise voltage $SV_{Z1}$ is increased by $\Delta V_Z$, the laser beam spot is moved by a deflection distance $D_{Z1}$ which is less than about $D_{Z2}/10$. Similarly, a two-dimensional scan of the fine zone 104 can be achieved by varying the ramp voltage $RV_{Y1}$ and the stepwise voltage $SV_{Z1}$ over a period of time $T_3$.

Figure 19A:
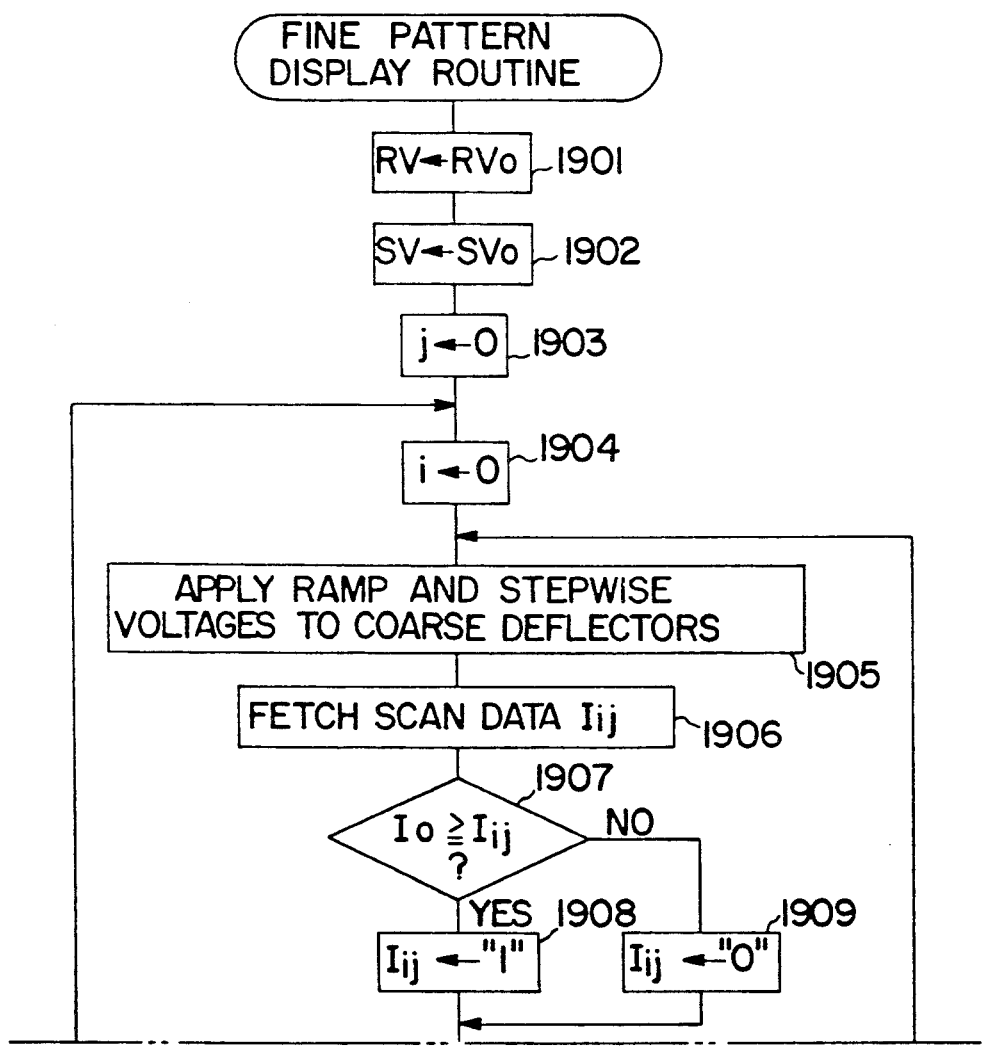
FIG. 19 is a flow chart of the process for displaying a fine pattern of a precision component on a display, on the basis of the coarse two-dimensional scan carried out by the two-dimensional optical scanning system as shown in FIGS. 10 to 17.
Figure 19B:
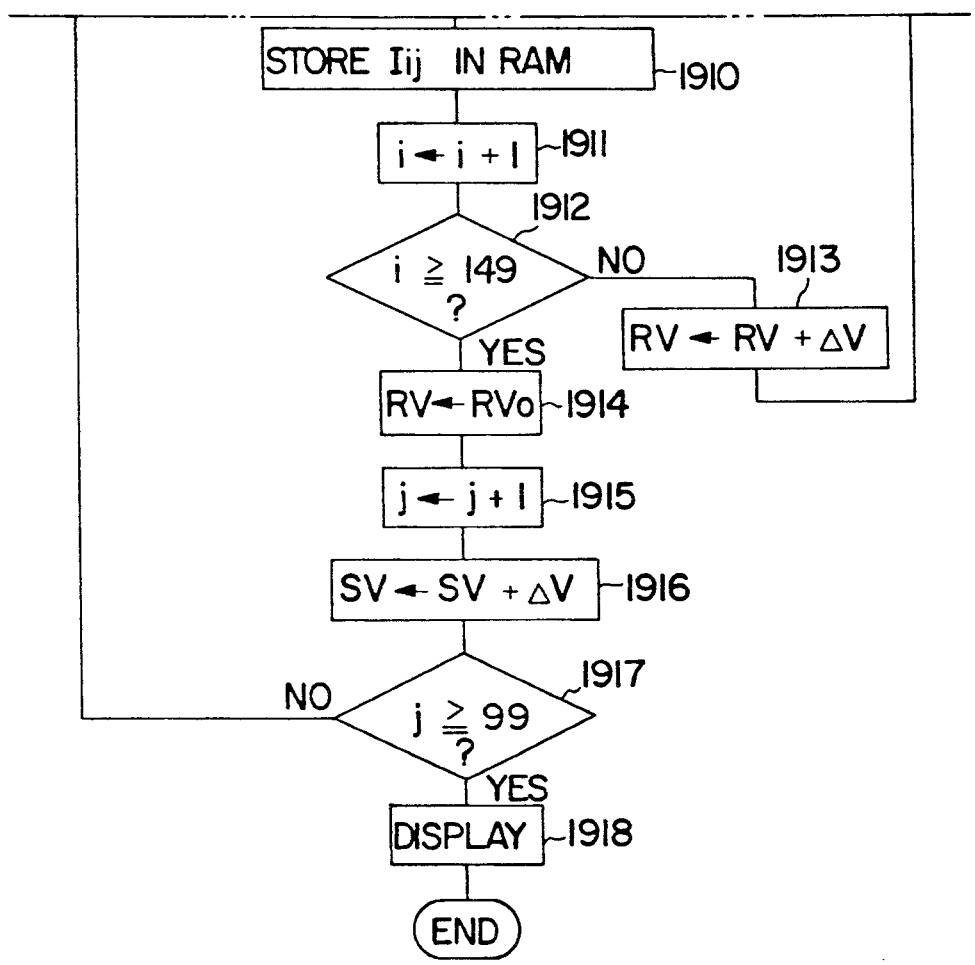

FIG. 19 is a flowchart of a routine for displaying a fine pattern of a precision component such as an integrated circuit, a magnetic head or the like on a display such as a CRT on the basis of a two-dimensional scan carried out by the third and fourth light deflection means 48 and 50. By displaying such a fine pattern, it is possible to orient the laser beam so that the laser beam spot can be easily positioned at a given initial scan position with respect to the fine pattern for a fine two-dimensional scan carried out by the first and second light deflection means 44 and 46. This is because levels of the ramp and stepwise voltages $RV_{Y2}$ and $SV_{Z2}$ for the orientation of laser beam can be easily read from the displayed fine pattern. Note, in this routine, it is assumed that a reflectivity of the fine pattern is lower than that of the remaining zone.

At steps 1901 and 1902, the ramp and stepwise voltages RV and SV are set at initial voltages $RV_o$ and $SV_o$, respectively, and at steps 1903 and 1904, counters i and j are reset.

At step 1905, the ramp and stepwise voltages RV and SV are applied by the driver circuits 56 and 58 to the third and fourth light deflection means 48 and 50, respectively. At step 1906, scan data $I_{ij}$ is fetched from an analog-to-digital converter, which is included in the control circuit 60, and which converts an analog voltage signal detected by the photo detector 64 into a digital signal.

At step 1907, the fetched scan data $I_{ij}$ is compared with a threshold $I_o$ which is suitably set so that it has a value between a level of intensity of a laser beam reflected from the fine pattern and a level of intensity of a laser beam reflected from the remaining zone. If $I_o \geq I_{ij}$, the control proceeds to step 1908 in which $T_{ij}$ is made "1". If $I_o < I_{ij}$, the control proceeds to step 1909 in which $I_{ij}$ is made "0". At step 1910, $I_{ij}$ (1 or 0) is stored in a random access memory (RAM) included in the control circuit 60.

At step 1911, the counter i is incremented by 1. At step 1912, if i<149, the control proceeds to step 1913 in which the ramp voltage RV is increased by $\Delta V$. The routine including steps 1905 to 1913 is repeated 150 times until one hundred fifty data (i=0 to 149) are stored in the RAM.

At step 1912, if i≧149, the control proceeds to step 1914 in which the ramp voltage is reset to the initial voltage $V_o$. At step 1915, the counter j is incremented by 1, and then at step 1916, the stepwise voltage SV is increased by $\Delta V$.

At step 1917, if j<99, the control proceeds to step 1904 in which the counter i is reset. Then, the routine including steps 1905 to 1917 is again repeated 150 times until one hundred fifty data (i=0 to 149) are stored in the RAM. This repetition is continued until the count number counted by the counter j reaches 99, and thus data (1 or 0) representing the fine pattern are stored in the RAM.

At step 1916, if j≧99, the control proceeds to step 1918 in which the fine pattern is displayed at a suitable displayer on the basis of data (1 or 0) stored in the RAM.

FIG. 20 shows a novel light deflection prism which can be advantageously used in the two-dimensional optical scanning system. The light deflection prism comprises a first prism element 106 having a cross section of an equilateral triangle, and a second prism element 108 having a cross section of a right-angle triangle having angles 90, 60 and 30 degrees. The first prism element 106 is combined with the second prism element 108 in such a manner that one of the three corners of the first prism element 106 forms a right angle together with the corner having an angle of 30 degrees of the second prism element, so that the light deflection prism is provided with two parallel faces 106a and 108a.

Figure 20A:
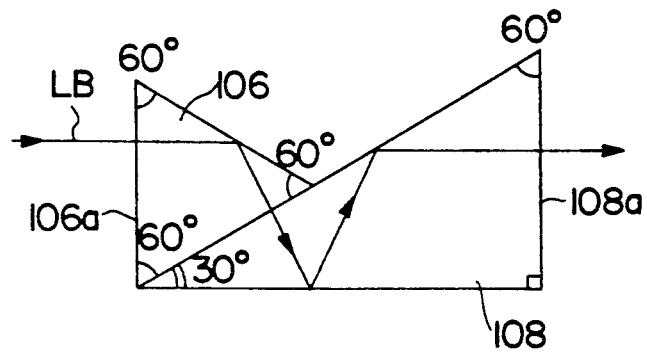
FIGS. 20(a) and 20(b) are elevational views of a light deflection prism which can be advantageously used in the two-dimensional optical scanning system according to the present invention.
Figure 20B:
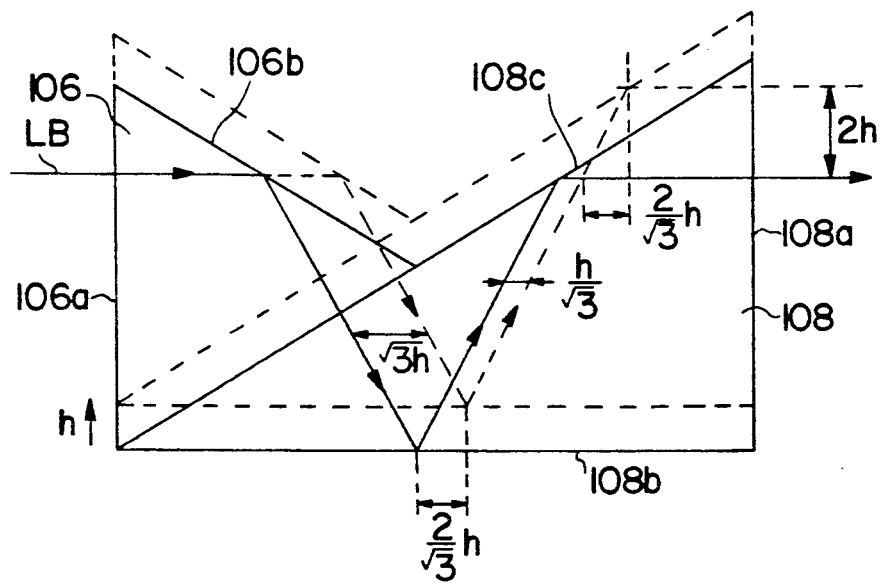

When a light beam LB is incident upon the face 106a at a given location as shown in FIG. 20(a), the light beam LB is reflected at a face 106b of the first prism element 106, and is then reflected at a bottom face 108b of the second prism element 108. The light beam LB is further reflected at a face 108c of the second prism element 108, and is emitted from the face 108a thereof in such a manner that the incident light beam is aligned with the emitted light. When, however, the light deflection prism is moved upward by a distance of h with respect to the incident light beam, as shown in FIG. 20(b), the light beam LB is subjected to reflections as shown by a broken line in FIG. 20(b), so that the emitted light beam (broken line) is deflected from the original light beam (solid line) for a deflection distance of 2h.

This light deflection prism is characterized in that the light beam LB can be incident on one of the parallel faces 106a and 108a at a right angle and emitted at a right angle from the other face. With this arrangement, although a diverging light beam is incident upon one of the one of parallel faces 106a and 108a, it is possible to deflect the diverging light beam without aberration. Conversely, when the diverging light beam is deflected by the dove prism, an aberation may occur in the emitted light beam because of the opposed slanting faces thereof. Accordingly, in the embodiments of the two-dimensional optical scanning system, preferably the light deflection prism as shown in FIG. 20 is used in place of the dove prism.

It will be further understood by those skilled in the art that the foregoing description is of preferred embodiments of the disclosed system and that various changes and modifications may be made to the present invention without departing from the spirit and scope thereof.

We claim:

1. A two-dimensional optical scanning system comprising:
 a first light deflection means for a stepwise deflection of a laser beam by a fine pitch in a first plane including an optical axis of the optical scanning system;
 a second light deflection means for a stepwise deflection of the laser beam by a fine pitch in a second plane perpendicular to said first plane and including said optical axis; and
 one of said first and second light deflection means comprising an acoustic-optical device, and the other means comprising a dove prism, whereby a fine two-dimensional laser beam scan can be carried out by said first and second light deflection means on a plane perpendicular to said optical axis in two directions perpendicular to each other.

2. The two-dimensional optical scanning system of claim 1, wherein the laser beam is deflected stepwise at a fine pitch of less than 0.01 μm by each of the acoustic-optical device and the dove prism.

3. The two-dimensional optical scanning system of claim 1, further comprising:
 a third light deflection means for a stepwise deflection of the laser beam in said first plane by a pitch larger than the fine deflection distance by which said first light deflection means causes a stepwise deflection of the laser beam; and
 a fourth light deflection means for a stepwise deflection of the laser beam in said second plane by a pitch larger than the fine distance by which said second light deflection means causes a stepwise deflection of the laser beam, whereby a coarse two-dimensional laser beam scan can be carried out by said third and fourth light deflection means along a plane perpendicular to said optical axis in two directions perpendicular to each other.

4. The two-dimensional optical scanning system of claim 3, wherein each of said third and fourth light deflection means comprises a galvano mirror.

5. The two-dimensional optical scanning system of claim 3, wherein the laser beam is deflected stepwise at a fine pitch of less than 0.01 μm by each of the acoustic-optical device and the dove prism.

6. A two-dimensional optical scanning system comprising:
- a first light deflection means for a stepwise deflection of a laser beam by a fine pitch in a first plane including an optical axis of the optical scanning system;
- a second light deflection means for a stepwise deflection of the laser beam by a fine pitch in a second plane perpendicular to said first plane and including said optical axis; and
- each of said first and second light deflection means comprising a dove prism, whereby a fine two-dimensional laser beam scan can be carried out by said first and second light deflection means on a plane perpendicular to said optical axis in two directions perpendicular to each other.

7. The two-dimensional optical scanning system of claim 6, wherein the laser beam is deflected stepwise at a fine pitch of less than 0.01 μm by the dove prisms.

8. The two-dimensional optical scanning system of claim 6, further comprising:
- a third light deflection means for a stepwise deflection of the laser beam in said first plane by a pitch larger than the fine deflection distance by which said first light deflection means causes a stepwise deflection of the laser beam; and
- a fourth light deflection means for a stepwise deflection of the laser beam in said second plane by a pitch larger than the fine distance by which said second light deflection means causes a stepwise deflection of the laser beam, whereby a coarse two-dimensional laser beam scan can be carried out by said third and fourth light deflection means along a plane perpendicular to said optical axis in two directions perpendicular to each other.

9. The two-dimensional optical scanning system of claim 8, wherein each of said third and fourth light deflection means comprises a galvano mirror.

10. The two-dimensional optical scanning system of claim 8, wherein the laser beam is deflected stepwise at a fine pitch of less than 0.01 μm by each of the dove prisms.

11. A two-dimensional optical scanning system comprising:
- a first light deflection means for a stepwise deflection of a laser beam by a fine pitch in a first plane including an optical axis of the optical scanning system;
- a second light deflection means for a stepwise deflection of the laser beam by a fine pitch in a second plane perpendicular to said first plane and including said optical axis; and
- at least one of said first and second light deflection means comprising a light deflection prism comprising a first prism element having a cross section of an equilateral triangle, and a second prism element having a cross section of a right-angle triangle having angles of 90, 60 and 30 degrees, said first prism element being combined with said second prism element in such a manner that one of the three corners of said first prism element forms a right angle together with the corner having an angle of 30 degrees of said second prism element, whereby a fine two-dimensional laser beam scan can be carried out by said first and second light deflection means on a plane perpendicular to said optical axis in two directions perpendicular to each other.

12. The two-dimensional optical scanning system of claim 11, wherein the laser beam is deflected stepwise at a fine pitch of less than 0.01 μm by each of said first and second light deflection means.

13. The two-dimensional optical scanning system of claim 11, wherein one of said first and second light deflection means comprises said light deflection prism, and the other means comprises an acoustic-optical device.

14. The two-dimensional optical scanning system of claim 13, wherein the laser beam is deflected stepwise at a fine pitch of less than 0.01 μm by each of said light deflection prism and acoustic-optical device.

15. The two-dimensional optical scanning system of claim 11, wherein one of said first and second light deflection means comprises said light deflection prism, and the other means comprises a dove prism.

16. The two-dimensional optical scanning system of claim 15, wherein the laser beam is deflected stepwise at a fine pitch of less than 0.01 μm by each of said light deflection prism and dove prism.

* * * * *